(12) United States Patent
Iwashina et al.

(10) Patent No.: US 9,706,440 B2
(45) Date of Patent: Jul. 11, 2017

(54) MOBILE COMMUNICATION SYSTEM, CALL PROCESSING NODE, AND COMMUNICATION CONTROL METHOD

(71) Applicant: NTT DOCOMO, INC., Chiyoda-ku (JP)

(72) Inventors: Shigeru Iwashina, Chiyoda-ku (JP); Tetsuya Nakamura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/398,222

(22) PCT Filed: Jan. 28, 2013

(86) PCT No.: PCT/JP2013/051766
§ 371 (c)(1),
(2) Date: Oct. 31, 2014

(87) PCT Pub. No.: WO2013/164917
PCT Pub. Date: Nov. 7, 2013

(65) Prior Publication Data
US 2015/0126202 A1    May 7, 2015

(30) Foreign Application Priority Data

May 2, 2012    (JP) ................................ 2012-105059

(51) Int. Cl.
*H04W 28/10*    (2009.01)
*H04L 12/24*    (2006.01)
(Continued)

(52) U.S. Cl.
CPC ......... *H04W 28/10* (2013.01); *H04L 41/0659* (2013.01); *H04L 43/0817* (2013.01); *H04W 24/04* (2013.01); *H04W 76/02* (2013.01)

(58) Field of Classification Search
CPC .. H04W 28/10; H04W 24/04; H04L 41/0659; H04L 43/0817
(Continued)

(56) References Cited

U.S. PATENT DOCUMENTS 4,827,499 A * 5/1989 Warty .................. H04W 76/02
379/269
6,363,411 B1 * 3/2002 Dugan .............. H04M 3/42136
379/201.01
(Continued)

FOREIGN PATENT DOCUMENTS

EP    1936937 A2 *  6/2008  ............. H04L 65/80
JP    2003 244191      8/2003
(Continued)

OTHER PUBLICATIONS

Marabu Ito, A proposal of Open Flowbased Routing Method for Call Session Control Message, Mar. 11, 2011.*
(Continued)

*Primary Examiner* — Marisol Figueroa
(74) *Attorney, Agent, or Firm* — Oblon, McClelland, Maier & Neustadt, L.L.P.

(57) ABSTRACT

A mobile communication system includes a plurality of call processing servers and a call processing management database that holds data necessary for call processing. The call processing server includes a call processing request accepting unit that accepts a request for call processing, a registration unit that registers the own node as the call processing server that is executing the call processing, an acquisition unit that acquires information of the mobile communication terminal related to the call processing request from the call processing management database or from the call processing server registered as the call processing server that is executing the call processing, a call processing unit that perform call processing, and a call processing result storage unit that
(Continued)

stores information of a result of the call processing in the call processing management database.

6 Claims, 12 Drawing Sheets

(51) Int. Cl.
*H04L 12/26* (2006.01)
*H04W 24/04* (2009.01)
*H04W 76/02* (2009.01)

(58) Field of Classification Search
USPC .......................................................... 455/445
See application file for complete search history.

(56) References Cited

U.S. PATENT DOCUMENTS

| | | | | | |
|---|---|---|---|---|---|
| 6,590,961 | B1* | 7/2003 | Gulli | ................... | H04Q 3/54558 379/9 |
| 6,594,355 | B1* | 7/2003 | Deo | ................... | H04M 3/42136 379/219 |
| 6,804,711 | B1* | 10/2004 | Dugan | .............. | H04M 3/42136 370/385 |
| 2002/0075900 | A1* | 6/2002 | Turina | .................... | H04L 29/06 370/467 |
| 2002/0120660 | A1* | 8/2002 | Hay | ...................... | G06F 9/4843 718/100 |
| 2007/0007331 | A1* | 1/2007 | Jasper | ................... | G06Q 20/20 235/379 |
| 2007/0118585 | A1* | 5/2007 | Inoue | ................. | G01C 21/3667 709/200 |
| 2007/0207805 | A1* | 9/2007 | Pallares Lopez | . | H04W 36/0033 455/436 |
| 2008/0239950 | A1* | 10/2008 | Hlibiciuc | ............ | H04M 7/0084 370/230 |
| 2010/0238840 | A1* | 9/2010 | Lu | ......................... | H04W 84/02 370/259 |
| 2010/0265938 | A1* | 10/2010 | Fullarton | ............ | H04L 65/1006 370/352 |
| 2011/0176528 | A1* | 7/2011 | Lu | ......................... | H04W 84/00 370/338 |
| 2011/0249812 | A1* | 10/2011 | Barnhouse | ........ | H04M 3/42136 379/201.01 |
| 2011/0314467 | A1* | 12/2011 | Pearson | .................. | G06F 9/455 718/1 |
| 2011/0317820 | A1* | 12/2011 | Torgersrud | .......... | H04M 3/4228 379/88.09 |
| 2013/0013732 | A1* | 1/2013 | Machida | ............... | G06F 9/5077 709/217 |

FOREIGN PATENT DOCUMENTS

JP 2010224756 A * 10/2010
WO WO 2010/127017 A1 11/2010

OTHER PUBLICATIONS

International Preliminary Report on Patentability and Written Opinion issued Nov. 13, 2014, in International Application No. PCT/JP2013/051766 (English translation only).
International Search Report Issued Apr. 23, 2013 in PCT/JP13/051766 Filed Jan. 28, 2013.
Extended Search Report issued Dec. 22, 2015 in European Patent Application No. 13784729.9.
Yasir Zaki et al., "LTE mobile network virtualization, Exploiting multiplexing and multi-user diversity gain", Mobile Networks and Applications, Kluwer Academic Publishers, BO, vol. 16, No. 4, Jun. 10, 2011, XP019923415, pp. 424-432.

* cited by examiner (a)

(b)

(c)

(d)

(a)

(b)

(c)

(d)

(a)

(b)

(c)

(d)

MOBILE COMMUNICATION SYSTEM, CALL PROCESSING NODE, AND COMMUNICATION CONTROL METHOD

TECHNICAL FIELD

The present invention relates to a mobile communication system, a call processing node included in the mobile communication system, and a communication control method in the same.

BACKGROUND ART

In a mobile communication system, a call processing node performing call processing stops according to schedule for the purpose of maintenance or the like or suddenly stops due to, for example, occurrence of failure. In a call processing system for the mobile communication system, redundancy is required so that a communication call is not disconnected in any of such cases. Therefore, a call processing node (act) of an operation system and a call processing node (sby) of a standby system are provided to perform redundancy (multiplexing) of a device (for example, see Patent Literature 1).

CITATION LIST

Patent Literature

[Patent Literature 1] Japanese Patent Laid-Open No. 2003-244191

SUMMARY OF INVENTION

Technical Problem

Recently, states have been synchronized in real time between act and sby through production of high-availability middleware and a communication application of units of nodes to thereby perform multiplexing of the device. Therefore, a pair of servers having an act/sby configuration is assigned in a fixed manner and only servers within the call processing node are paired. Therefore, act and sby cannot be used at the same time in the event of, for example, damage of communication buildings at the time of disaster, and the redundancy does not function. As described above, in a dual configuration, a sby device cannot be used in common among a plurality of act devices and the configuration simply has a double facility amount, resulting in low economical efficiency.

In addition, the call processing node performs only call processing of users that are accommodated by the device. Accordingly, when any call processing node fails, users accommodated by the device cannot perform communication. Particularly, in mobile communication, users are gathered in a specific area, causing biased accommodation of the users.

In addition, when call processing nodes are scaled out to improve performance, there is no means of moving a user to an added call processing node during communication. Since a scheme of moving a user to a new server through a position registration process (an attaching process) that is triggered by, for example, power off/on of a mobile device should be used, scale-out takes a long time.

The present invention has been made in view of the aforementioned problems, and an object of the present invention is to provide a mobile communication system, a call processing node, and a communication control method that enable redundancy of a call processing node having excellent reliability, economical efficiency, and flexibility.

Solution to Problem

In order to achieve the above object, a mobile communication system according to an embodiment of the present invention is a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, wherein the control node comprises a node state recognition means that recognizes states of the plurality of call processing nodes; and a control means that determines a call processing node to process a call processing request from the mobile communication terminal based on the states of the plurality of call processing nodes recognized by the node state recognition means, and performs control so that the call processing request is processed by the determined call processing node, and the call processing node comprises a call processing request accepting means that accepts the call processing request subjected to the control of the control node; a registration means that registers the own node in the call processing management database as a call processing node that is executing the call processing for the mobile communication terminal related to the call processing request when the call processing request is accepted by the call processing request accepting means; an acquisition means that acquires information of the mobile communication terminal related to the call processing request accepted by the call processing request accepting means from the call processing management database, and acquires information of the mobile communication terminal related to the call processing request from the call processing node that is registered as a call processing node that is executing the call processing for the mobile communication terminal in the call processing management database; a call processing means that performs call processing related to the request using the information acquired by the acquisition means; and a call processing result storage means that stores information of a result of the call processing performed by the call processing means in the call processing management database, and ends registration in the call processing management database as a call processing node that is executing the call processing for the mobile communication terminal related to the call processing request when the call processing performed by the call processing means ends.

In the mobile communication system according to an embodiment of the present invention, data of each mobile communication terminal necessary for call processing is held in the call processing management database having a different configuration from the call processing node, and the information is referred to and stored newly each time the call processing is performed. Therefore, in this mobile communication system, call processing related to any mobile communication terminal can be performed by any call processing node. Also, in this mobile communication system, a call processing node to perform call processing is not determined for each mobile communication terminal, but the call processing can be performed in the call processing node determined in response to each call processing request by the control node.

As described above, in the present mobile communication system according to an embodiment of the present invention, the individual call processing servers are not set to an sby system or an act system, but call processing can be executed by any call processing server, thus enabling more economical redundancy of the call processing nodes. In addition, call processing is possible if any call processing server operates, thus enabling more reliable redundancy of the call processing servers. Further, since the individual call processing servers do not hold data of each mobile communication terminal necessary for call processing, the scale-out can also be easily realized.

Further, in the mobile communication system according to an embodiment of the present invention, the call processing node that is executing the call processing is registered in the call processing management database. When a call processing request is accepted by a call processing node other than the call processing node that is executing the call processing, information (information during state transition of the call processing) of a mobile communication terminal related to the call processing request is acquired from the other call processing node registered as a call processing node that is executing call processing. Therefore, even when a call processing node performing the call processing is changed during the call processing, since the information of the mobile communication terminal related to the call processing request is taken over between the call processing nodes, it is not necessary for the call processing node after change to acquire information acquired in the call processing node before change again through, for example, processing relief based on retransmission control. Accordingly, even when the call processing node performing the call processing is changed during the call processing, it is possible to perform efficient processing. Thus, according to the present mobile communication system, redundancy of the call processing nodes having excellent reliability, economical efficiency, and flexibility can be achieved.

The call processing node may consist of a virtualized virtual machine, and the control node may further comprise a virtualization control means that performs control of the virtualization based on the states of the plurality of call processing nodes recognized by the node state recognition means. In accordance with this configuration, it is possible to perform appropriate virtualization according to the states of the call processing nodes.

The mobile communication system may further include a flow control network, and the control means may configure the flow control network so that the call processing request is processed by the determined call processing node. In accordance with this configuration, redundancy of the call processing servers that does not depend on the position registration areas or the like can be realized, thus increasing the effects of the present invention described above.

The call processing node included in the mobile communication system itself has a new configuration and corresponds to the invention. In other words, a call processing node according to an embodiment of the present invention is a call processing node in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the call processing node including a call processing request accepting means that accepts a request of call processing subjected to control of the control node; a registration means that registers the own node in the call processing management database as a call processing node that is executing the call processing for the mobile communication terminal related to the call processing request when the call processing request is accepted by the call processing request accepting means; an acquisition means that acquires information of the mobile communication terminal related to the call processing request accepted by the call processing request accepting means from the call processing management database, and acquires information of the mobile communication terminal related to the call processing request from the call processing node that is registered as a call processing node that is executing the call processing for the mobile communication terminal in the call processing management database; a call processing means that performs call processing related to the request using the information acquired by the acquisition means; and a call processing result storage means that stores information of a result of the call processing performed by the call processing means in the call processing management database, and ends registration in the call processing management database as a call processing node that is executing the call processing for the mobile communication terminal related to the call processing request when the call processing performed by the call processing means ends.

Incidentally, the present invention can be described as an invention of a communication control method as will be described below, in addition to the inventions of the mobile communication system and the call processing node as described above. The inventions differ only in category, are substantially the same invention, and achieve the same operation and effects.

In other words, a communication control method according to an embodiment of the present invention is a communication control method in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the method including: a node state recognition step of recognizing, by the control node, states of the plurality of call processing nodes; a control step of determining, by the control node, the call processing node to process the call processing request from the mobile communication terminal based on the states of the plurality of call processing nodes recognized in the node state recognition step, and performing control so that the call processing request is processed by the determined call processing node; a call processing request accepting step of receiving, by the call processing node, the call processing request subjected to the control of the control node; a registration step of registering, by the call processing node, the own node in the call processing management database as a call processing node that is executing the call processing for the mobile communication terminal related to the call processing request when the call processing request is accepted in the call processing request accepting step; an acquisition step of acquiring, by the call processing node, information of the mobile communication terminal related to the call processing request accepted in the call processing request accepting step from the call processing management database, and acquiring information of the mobile communication terminal related to the call processing request from the call processing node that is registered as a call processing node that is executing the call processing for the mobile communication terminal in the call processing management database; a call processing step of performing, by the call processing node, call processing related to the request using the information acquired in the acquisition step; and a call processing result storage step of storing, by the call processing node, information of a result of the call processing performed in the call processing step in the call processing management database, and ending registration in the call processing management database as a call processing node that is executing the call processing for the mobile communication terminal related to the call processing request when the call processing performed in the call processing step ends.

Further, a communication control method according to an embodiment of the present invention is a communication control method in a call processing node in a mobile communication system that provides a mobile communication function to a mobile communication terminal and includes a plurality of call-processing nodes, a call processing management database that is connected to each of the plurality of call-processing nodes and holds data of each mobile communication terminal necessary for call processing, and a control node, the communication control method including: a call processing request accepting step of receiving a request of call processing subjected to control of the control node; a registration step of registering the own node in the call processing management database as a call processing node that is executing the call processing for the mobile communication terminal related to the call processing request when the call processing request is accepted in the call processing request accepting step; an acquisition step of acquiring information of the mobile communication terminal related to the call processing request accepted in the call processing request accepting step from the call processing management database, and acquiring information of the mobile communication terminal related to the call processing request from the call processing node that is registered as a call processing node that is executing the call processing for the mobile communication terminal in the call processing management database; a call processing step of performing call processing related to the request using the information acquired in the acquisition step; and a call processing result storage step of storing information of a result of the call processing performed in the call processing step in the call processing management database, and terminating registration in the call processing management database as a call processing node that is executing the call processing for the mobile communication terminal related to the call processing request when the call processing performed in the call processing step ends.

Advantageous Effects of Invention

In an embodiment of the present invention, the individual call processing nodes are not set to an sby system or an act system, but call processing can be executed by any call processing node, thus enabling more economical redundancy of the call processing nodes. In addition, call processing is possible if any call processing node operates, thus enabling more reliable redundancy of the call processing nodes. Further, since the individual call processing nodes do not hold data of each mobile communication terminal necessary for call processing, the scale-out can also be easily realized.

Further, in an embodiment of the present invention, even when a call processing node performing the call processing is changed during the call processing, since the information of the mobile communication terminal related to the call processing request is taken over between the call processing nodes, it is not necessary for the call processing node after change to acquire information acquired in the call processing node before change again through, for example, processing relief based on retransmission control. Accordingly, even when the call processing node performing the call processing is changed during the call processing, it is possible to perform efficient processing. Thus, according to the present invention, redundancy of the call processing nodes having excellent reliability, economical efficiency, and flexibility can be achieved.

DESCRIPTION OF EMBODIMENTS

Figure 1:
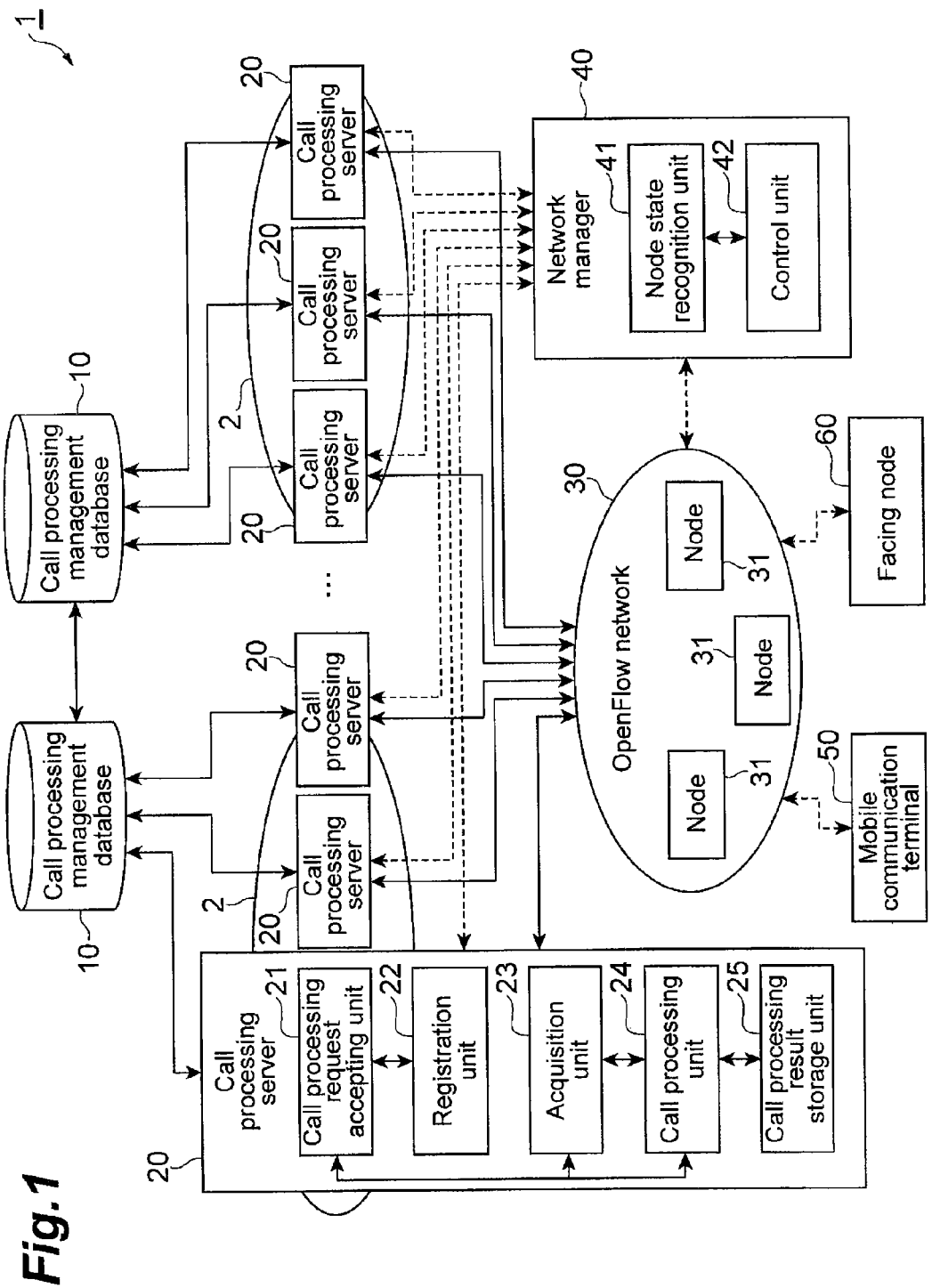
FIG. 1 is a diagram illustrating a configuration of a mobile communication system and a functional configuration of a device constituting the mobile communication system according to an embodiment of the present invention.

Hereinafter, embodiments of a mobile communication system, a call processing node and a communication control method according to the present invention will be described in detail with reference to the drawings. In addition, the same elements are denoted with the same reference signs in the description of the drawing and a repeated description will be omitted.

A configuration of a mobile communication system 1 according to the present embodiment is illustrated in FIG. 1. The mobile communication system 1 is a system that provides a mobile communication function to a mobile communication terminal (mobile device) 50. The mobile communication terminal 50 is a terminal used by a user, and is connected to the mobile communication system (mobile communication network) through wireless communication to perform mobile communication. Specifically, the mobile communication terminal 50 corresponds to, for example, a mobile phone. The mobile communication terminal 50 establishes, for example, call connection with a facing node 60 via the mobile communication system 1 to perform communication. The facing node 60 corresponds to, for example, another mobile communication terminal, a server device that provides various services to the mobile communication terminal 50 or a device (for example, a GGSN (Gateway GPRS Support node)) for connection to another communication network. The mobile communication terminal 50 can perform mobile communication according to a contract between a user of the mobile communication terminal 50 and a communication carrier of the mobile communication system 1. In addition, the mobile communication terminal 50 may be the same as a conventional mobile communication terminal.

The mobile communication system 1 includes call processing management databases 10, a plurality of call processing servers 20, an OpenFlow network 30, and a network manager 40, as illustrated in FIG. 1. In addition, the configurations 10, 20, 30 and 40 constitute a core network of the mobile communication system (mobile communication network) 1.

The call processing management database 10 is a database that holds data necessary for call processing. The call processing management database 10, for example, holds the data in association with information that identifies the mobile communication terminal 50 for each mobile communication terminal 50. Specifically, state information indicating a state of the call processing and a subscriber profile related to the mobile communication terminal 50 is held as the data necessary for call processing. The state information includes information of an area in which the mobile communication terminal 50 is present and information indicating whether the mobile communication terminal 50 is during communication or standby (static state information). This information is read and updated (written) by the call processing server 20, as will be described below. The call processing management database 10 also holds dynamic state information according to this embodiment. The dynamic state information will be described in greater detail below together with the static state information.

In addition, data of the subscriber profile includes information such as a phone number, certification information, and contract speed of the mobile communication terminal 50. This information is newly stored (generated) as a subscriber profile in the call processing management database 10 when the user of the mobile communication terminal 50 has contracted with the communication carrier of the mobile communication system 1. This information is read by the call processing server 20, but not updated (written) by the call processing server 20. In addition, the data stored for each mobile communication terminal 50 includes items for which both reading (Read) and writing (Write) occur as described above and items for which only reading (Read) occurs. Prevention of delay of Read caused by waiting for synchronization of Write can be devised by separately managing records of these items in the call processing management database 10.

The call processing management database 10 is connected to each of the plurality of call processing servers 20, and reference, registration and update of data held in the call processing management database 10 is performed by the call processing server 20. The call processing management database 10 may have any configuration as a database, but in consideration of holding of the data necessary for call processing, may be configured in such a manner that there is no SPOF (Single Point of Failure) as distributed databases realized in the plurality of server devices, as illustrated in FIG. 1.

Here, the call processing is a process related to call connection between the mobile communication terminal 50 and the facing node 60 via the mobile communication system 1. For example, call processing is a process of establishing call connection between the mobile communication terminal 50 and the facing node 60 (referred to also as communication session connection) or a process of disconnecting the call connection. Further, a process for causing the mobile communication terminal to be present in the mobile communication system 1, that is, a position registration process, may also be included in the call processing in the present embodiment.

Figure 2:
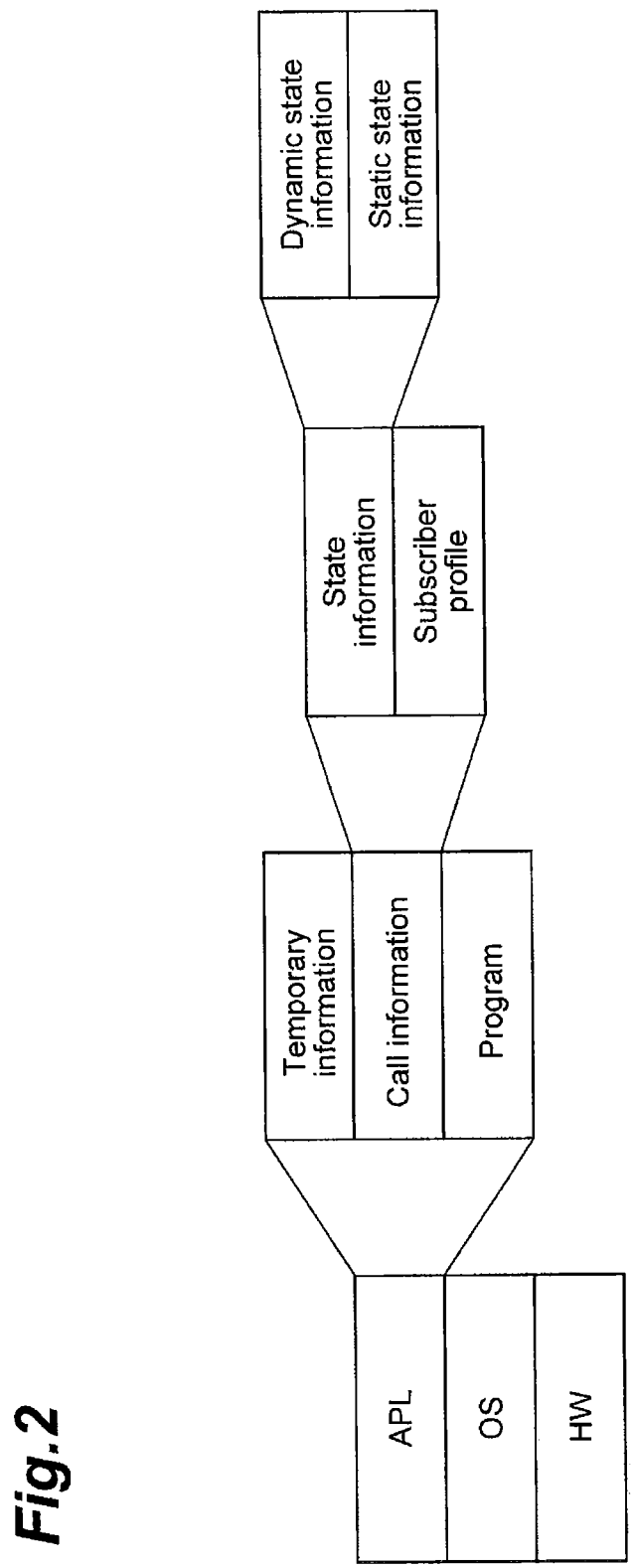
FIG. 2 is a diagram illustrating data held in a call processing server.

The call processing server 20 is a call processing node that performs call processing in the mobile communication system 1. The call processing server 20 is connected to the mobile communication terminal 50 and the facing node 60 via the OpenFlow network 30 as illustrated in FIG. 1, and performs call processing according to, for example, a request from the mobile communication terminal 50. The call processing server 20 is realized by functions of an HW (hardware) layer, an OS (operating system) layer, and an APL (application) layer, as illustrated in FIG. 2. In addition, the call processing server 20 may be realized as a virtual server in order to facilitate a process at the time of failure or scale-out to be described below.

In the APL layer, call information, temporary information, and a program are stored on a memory, as illustrated in FIG. 2. Call information is data necessary for call processing and is state information holding state transition of a call, and a subscriber profile. The state information includes static state information and dynamic state information. The static state information is, for example, information indicating a communication state (call state) of the mobile communication terminal 50, such as standby, call originating, and communicating. The dynamic state information is information related to call processing that is being executed, and is, for example, last update date and time, or an update node ID (for example, an IP address of P-CSCF that is one of the call processing servers 20) that is information for identifying the call processing server 20 that is performing call processing.

The call information, for example, is acquired from the call processing management database 10 and held only at the time of call processing. In addition, the call information may be held in the call processing server 20 for efficiency of processing as a cache even after call processing, but the call processing server 20 has no responsibility for the call information. The temporary information is temporary information (information during a sequence such as position registration and call origination) used during call processing (a signal sequence). For example, the temporary information is temporary information used in a transient state in which a change occurs from a standby status to a communication status. This temporary information is transmitted and received between the call processing servers 20, as will be described below. The program is an executable code itself (information of executable binary) for realizing a function of the call processing server 20.

A plurality of call processing servers 20 are included in the mobile communication system 1. A plurality of bases (places such as data centers) 2 may be provided and one or more call processing servers 20 may be provided in the respective bases 2 in consideration of, for example, a case in which any call processing server 20 fails due to disaster, as illustrated in FIG. 1. The call processing server 20 is preferably realized as a virtual server that is virtualized using a virtual machine technology in a server device. In addition, in this embodiment, while the call-processing node is described as a virtual machine, the call-processing node may be realized as a call-processing server rather than a virtual machine by an individual server device. In a conventional mobile communication system, the call-processing server 20, for example, corresponds to a node such as an SGSN (Serving GPRS Support Node), a CSCF (Call Session Control Function), or an AS (Application Server).

Figure 3:
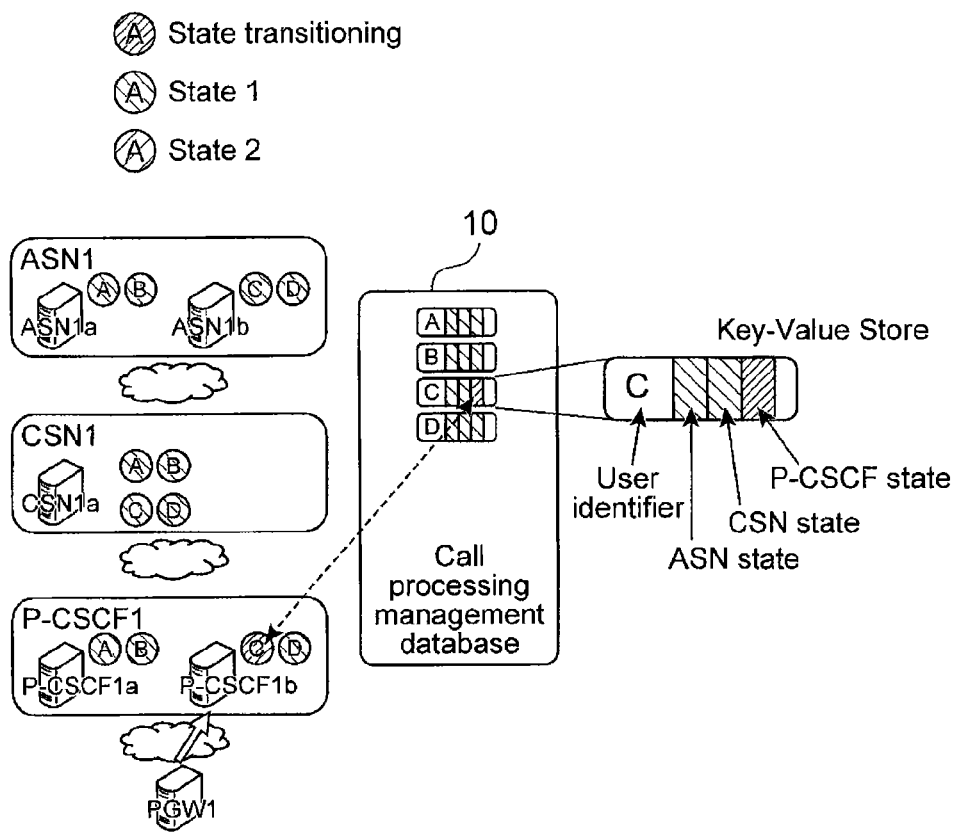
FIG. 3 is a diagram illustrating details of a part of information stored in the call processing server and a call processing management database.

Alternatively, in an IMS (IP Multimedia Subsystem), the call processing servers 20 are a P-CSCF (Proxy-Call Session Control Function), a CSN (Call Session control Node), and an ASN (Application Serving Node), as illustrated in FIG. 3. A signal related to call processing is input from a P-GW (Packet Data Network Gateway) included in the mobile communication system 1 to P-CSCF, and call processing is performed sequentially in the P-CSCF, the CSN and the ASN, as illustrated in FIG. 3. In this embodiment, the P-CSCF, the CSN and the ASN will be described by way of example as the call processing servers 20. In addition, the P-CSCF, the CSN and the ASN according to this embodiment have functions according to this embodiment to be described below, in addition to functions of an existing P-CSCF, CSN and ASN.

The OpenFlow network 30 is a flow control network connected to the call processing servers 20, the mobile communication terminal 50 and the facing node 60, and constituting a communication path between such devices. In addition, the OpenFlow network 30 and the mobile communication terminal 50 are usually connected via a base station (BTS) and a radio network controller (RNC). The OpenFlow network 30 includes a plurality of nodes 31 that are OpenFlow switches connected to one another. The node 31 corresponds to a device which is usually used as an OpenFlow switch of the OpenFlow network. The OpenFlow network 30 performs transmission and reception of the information under control of an OpenFlow controller of the network manager 40, as will be described below. Specifically, each node 31 of the OpenFlow network 30 receives, from the network manager 40, a flow entry indicating a node to which information received by the own node is to be transmitted, and performs transmission and reception of the information according to the flow entry. While the OpenFlow network is described in the present description, a network known as an SDN (Softwarer defined network) performing similar flow control and a flow transfer process according to the control may be used.

The network manager 40 is a control node that controls transmission and reception of information in the OpenFlow network 30. The control, for example, is performed by an OpenFlow controller performing load balancing control included in the network manager 40. Control to be concretely performed will be described below. The network manager 40 is connected to each call processing server 20, and can perform transmission and reception of information.

Next, functions according to this embodiment of the network manager 40 and the call processing server 20 will be described in greater detail. The network manager 40 comprises a node state recognition unit 41 and a control unit 42, as illustrated in FIG. 1. In addition, when the call processing server is virtualized and consists of a virtual machine, the network manager 40 may further comprise a virtual machine control unit (not illustrated) that performs control of the virtualized call processing server (virtual call processing server). Through this control, specifically, provisioning of the virtual call processing server is performed.

The node state recognition unit 41 is a node state recognition means that recognizes states of the plurality of call processing servers 20. First, the node state recognition unit 41 recognizes which call processing servers 20 are present. This is performed, for example, by receiving information indicating new installation from the call processing server 20 when the call processing server 20 is newly installed for scale-out or the like. In addition, the node state recognition unit 41 recognizes, as a state of the call-processing server 20, information on a load of each server or on whether or not a failure occurs. This information, for example, is recognized by the node state recognition unit 41 by receiving information from the call processing servers 20 through periodical inquiry from the node state recognition unit 41 or voluntary transmission from the node state recognition unit 41. The node state recognition unit 41 outputs information indicating the recognized state of each call processing server 20 to the control unit 42.

The control unit 42 is a control means that determines (allocates) the call processing server 20 that will process a call processing request from the mobile communication terminal 50 based on the respective states of the plurality of call processing servers 20 recognized by the node state recognition unit 41, and performs control so that the call processing request is processed by the determined call processing server 20. Specifically, the control unit 42 configures the OpenFlow network 30 so that the call processing request is processed by the determined call processing server 20.

The control unit 42 determines the call processing server 20 for which the call processing is to be controlled, based on the states of the respective call processing servers 20. For example, the control unit 42 determines the call processing server 20 that will process call processing so that the call processing server 20 that fails or suffers from a process load equal to or more than a certain threshold does not become the call processing server 20 that will process call processing. In addition, the call processing server 20 that will process call processing may be determined so that the process load becomes as uniform as possible among the call processing servers 20. In addition, the call processing server 20 that will perform call processing may be determined according to the mobile communication terminal 50. A criterion (execution scenario) of the determination of the call processing server 20 that will process call processing, for example, may be stored in the control unit 42 by the communication carrier of the mobile communication system 1 in advance.

The control unit 42 generates a flow entry so that the call processing request from the mobile communication terminal 50 is transmitted to the determined call processing server 20, and transmits the generated flow entry to each node 31 of the OpenFlow network 30.

The determination of the call processing server 20 that will process the call processing and the generation of the flow entry may be performed, for example, at every certain period of time (for example, at every specific time) or when a state of the call processing server 20 changes (for example, when the call processing server 20 stops due to failure, process congestion, or maintenance, or the like).

In addition, the OpenFlow network 30 is also provided between the call processing servers 20, and control of a transmission destination of a signal between the call processing servers (for example, between the P-CSCF and the CSN or between the CSN and the ASN) is also performed as described above.

The virtual machine control unit is a virtualization control means that controls the virtualization based on the respective states of the plurality of call processing servers 20 recognized by the node state recognition unit 41 when the call processing server is virtualized. This is, for example, control such as new provisioning of the virtual call processing server 20 by sending an instruction from the virtual machine control unit to a hypervisor when the call processing server 20 is desired to be added for scale-out or the like according to a state of each call processing server 20. Accordingly, it is possible to perform appropriate virtualization according to the state of the call processing server 20. More specifically, provisioning of the virtual machine by the virtual machine control unit is controlled in an integrated manner (processes are synchronized), thus enabling a more appropriate scale-out process, or a process at the time of failure, as will be described below.

The call processing server 20 comprises a call processing request accepting unit 21, a registration unit 22, an acquisition unit 23, a call processing unit 24, and a call processing result storage unit 25.

The call processing request accepting unit 21 is a call processing request accepting means that accepts (receives) the call processing request that is transmitted from the OpenFlow network 30 to the own node 20 under control of the network manager 40. The call processing request is a call origination request (a call connection establishment request) or a position registration request. The call processing request accepting unit 21 outputs the received call processing request to the registration unit 22, the acquisition unit 23 and the call processing unit 24.

The registration unit 22 is a registration means that registers the own node in the call processing management database 10 as the call processing server 20 that is executing call processing for the mobile communication terminal 50 related to the call processing request when the call processing request is input from the call processing request accepting unit 21.

As illustrated in FIG. 3, the call processing management database 10 holds information (Key-Value Store (KVS)) indicating the state of call processing of each type of call processing server 20 in association with a user identifier that is information for identifying the mobile communication terminal 50. The type of the call processing server 20 includes, for example, P-CSCF, CSN, and ASN. Information indicating the state of call processing is static state information and dynamic state information. This information can be referred to in order to determine which call processing server 20 of the type is executing the call processing for the mobile communication terminal 50. A state in which call processing is not being executed is, for example, a state such as "state 1" or "state 2" illustrated in FIG. 3. A state in which call processing is being executed (a call state is transitioning) is, for example, a state such as "state transitioning" illustrated in FIG. 3). In addition, a legend illustrated in FIG. 3 is the same in subsequent drawings.

An update node ID (for example, an IP address of the call processing server 20) that is information for identifying the call processing server 20 that is executing the call processing for the mobile communication terminal 50 is contained in the dynamic state information. In the example of the information of the mobile communication terminal 50 having the user identifier "C" illustrated in FIG. 3, a state of the call processing related to ASN (an ASN state) is "state 1 (for example, a standby state)," a state of the call processing related to CSN (an ASN state) is "state 1," and a state of the call processing related to P-CSCF (a P-CSCF state) is "state transitioning." In addition, a node ID of P-CSCF1b is contained in the information indicating a P-CSCF state as the update node ID of the call processing server 20 that is executing the call processing.

When the call processing request is input from the call processing request accepting unit 21, the registration unit 22 identifies the mobile communication terminal 50 of a request source from the request. For example, when the call processing request is a call origination request from the mobile communication terminal 50 having the user identifier "C" to the facing node (a call origination request from user C to user X), the registration unit 22 identifies the mobile communication terminal 50 having the user identifier "C" as the mobile communication terminal 50 of a call processing request source. The registration unit 22 transmits a dynamic state information update request containing the identified user identifier and the node ID of the own node to the call processing management database 10. The call processing management database 10 receives the dynamic state information update request, and updates (registers) information indicating the state of call processing associated with the user identifier using the user identifier as a key, based on the received dynamic state information update request. Through this registration, the state of the mobile communication terminal 50 becomes a state in which the call processing is being executed (state transitioning).

The acquisition unit 23 is an acquisition means that acquires information of the mobile communication terminal 50 related to the call processing request accepted by the call processing request accepting unit 21 from the call processing management database 10. The acquisition unit 23 extracts the information for identifying the mobile communication terminal 50 that is the call processing request source contained in the call processing request, and requests the call processing management database 10 to transmit the information related to the mobile communication terminal 50. The information requested here is the call information illustrated in FIG. 2, and, specifically, is information of a phone number, authentication information, contract speed, an area in which the terminal is present, and communicating/standby, as described above. In addition, when the call processing related to the mobile communication terminal 50 is performed in the own node 20 and an available cache of call information remains in the own node 20 and if last update time of the cache is not older than the last update time of the call processing management database 10, the acquisition by the acquisition unit 23 may not be performed. The acquisition unit 23 outputs the information acquired from the call processing management database 10 to the call processing unit 24.

In addition, when another call processing server 20 that is the same type as the own node but is not the own node, is executing call processing for the mobile communication terminal 50 that is a call processing request source, the acquisition unit 23 acquires information for call processing from the other call processing server 20 and takes over and executes the call processing. When the information indicating the state of call processing of the same type as that of the own node, which is held in association with the user identifier of the mobile communication terminal 50 that is a call processing request source in the call processing management database 10, indicates that the call processing is being executed in another call processing server 20 other than the own node, the acquisition unit 23 acquires an update node ID that is information for identifying the other call processing server 20.

This acquisition is performed, for example, by the acquisition unit 23 referring to information (flag) indicating that the mobile communication terminal 50 that is a call processing request source is state-transitioning, which is stored in the call processing management database 10. Alternatively, the acquisition may be performed by the call processing management database 10 transmitting the update node ID of the server of the other call processing server 20 when the call processing server 20 other than the own node is registered as the call processing server 20 that is executing call processing for the mobile communication terminal 50 according to the call processing request upon the registration of the own node in the call processing management database 10 by the registration unit 22.

The acquisition unit 23 acquires information of the mobile communication terminal 50 related to the call processing request from the other call processing server 20. The acquisition of this information is performed by requesting the other call processing server 20 to synchronize the information of the mobile communication terminal 50. The information acquired here is temporary information (information during a sequence such as position registration or call origination) that is used during call processing (signal sequence), and is information that is not registered in the call processing management database 10.

In addition, when the information is acquired from the other call processing server 20 and the call processing is taken over, there is no particular need to acquire the information from the call processing management database 10 if the call processing can be taken over with only the information acquired from the other call processing server 20. The acquisition unit 23 outputs the information acquired from the other call processing server 20 to the call processing unit 24.

In addition, a change of the call processing server 20 executing the call processing during the call processing is because a signal path is changed by the OpenFlow network 30 during execution of the call processing due to addition of the call processing server 20, removal of the call processing server 20 or other causes. The configuration of this embodiment is intended to enable the call processing to be continued without acquiring information acquired in the call processing server 20 before change again through, for example, processing relief based on retransmission control even when the path of the signal is changed by the OpenFlow network 30 during the execution of the call processing in this way.

The call processing unit 24 is a call processing means that performs call processing related to the request using the information acquired by the acquisition unit 23. Specifically, a call connection establishment or disconnection process or a position registration process (a process of registering or updating an area in which the terminal is present) is performed. When information for call processing is acquired from the other call processing server 20, the call processing unit 24 performs a process of taking over the call processing that has been performed by the other call processing server 20. The call processing unit 24 outputs information of a result of the call processing to the call processing result storage unit 25.

The call processing result storage unit 25 is a call processing result storage means that stores information of a result of the call processing performed by the call processing unit 24 in the call processing management database 10. Specifically, the call processing result storage unit 25 is information of an area in which the mobile communication terminal 50 is present or of whether the mobile communication terminal 50 is during communication or standby, which has been updated by the call processing. This information is information necessary for next call processing related to the mobile communication terminal 50. The storage of the information in the call processing management database 10 by the call processing result storage unit 25 may be performed only when the call information (state information) has been changed. When the storage of the information in the call processing management database 10 by the call processing result storage unit 25 is performed, last update time is updated with the current time.

The call processing result storage unit 25 ends the registration in the call processing management database 10 of the call processing server 20 that is executing the call processing for the mobile communication terminal 50 related to the call processing request when the call processing performed by the call processing unit 24 ends. The call processing result storage unit 25 notifies the call processing management database 10 that the call processing in the own node ends, and the state of the call processing of the type of the own node on the mobile communication terminal 50 has transitioned from state transitioning to a state in which the call processing is not being executed in any call processing server 20. In addition, this notification may be performed in conjunction with the storage of the result of the call processing. The call processing management database 10 receives this notification and updates the information on the mobile communication terminal 50 based on the notification. This is a function according to the embodiment of the network manager 40 and the call processing server 20.

Figure 4:
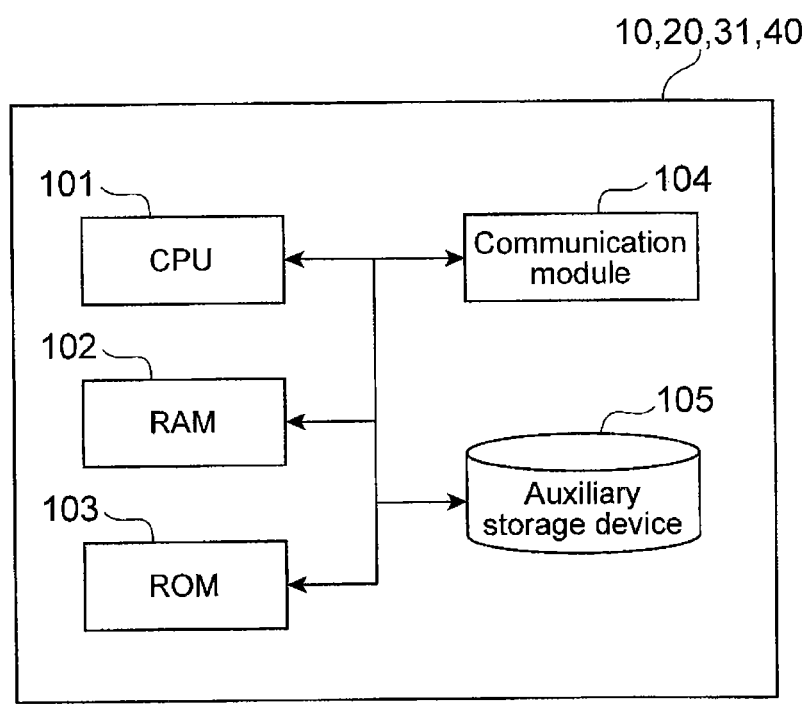
FIG. 4 is a diagram illustrating a hardware configuration of the device constituting the mobile communication system according to an embodiment of the present invention.

A hardware configuration of a server device constituting the call processing management database 10, the call processing server 20, the node 31 of the OpenFlow network 30 and the network manager 40 according to the embodiment is illustrated in FIG. 4. The server device includes a computer including hardware such as a CPU 101, a RAM (Random Access Memory) 102 and a ROM (Read Only Memory) 103 that constitute a main storage device, a communication module 104 for communication, and an auxiliary storage device 105 such as a hard disk, as illustrated in FIG. 4. The function of each of the nodes 10, 20, 31 and 40 described above is exhibited by such components operating according to a program or the like. This is a configuration of the mobile communication system 1.

Figure 5:
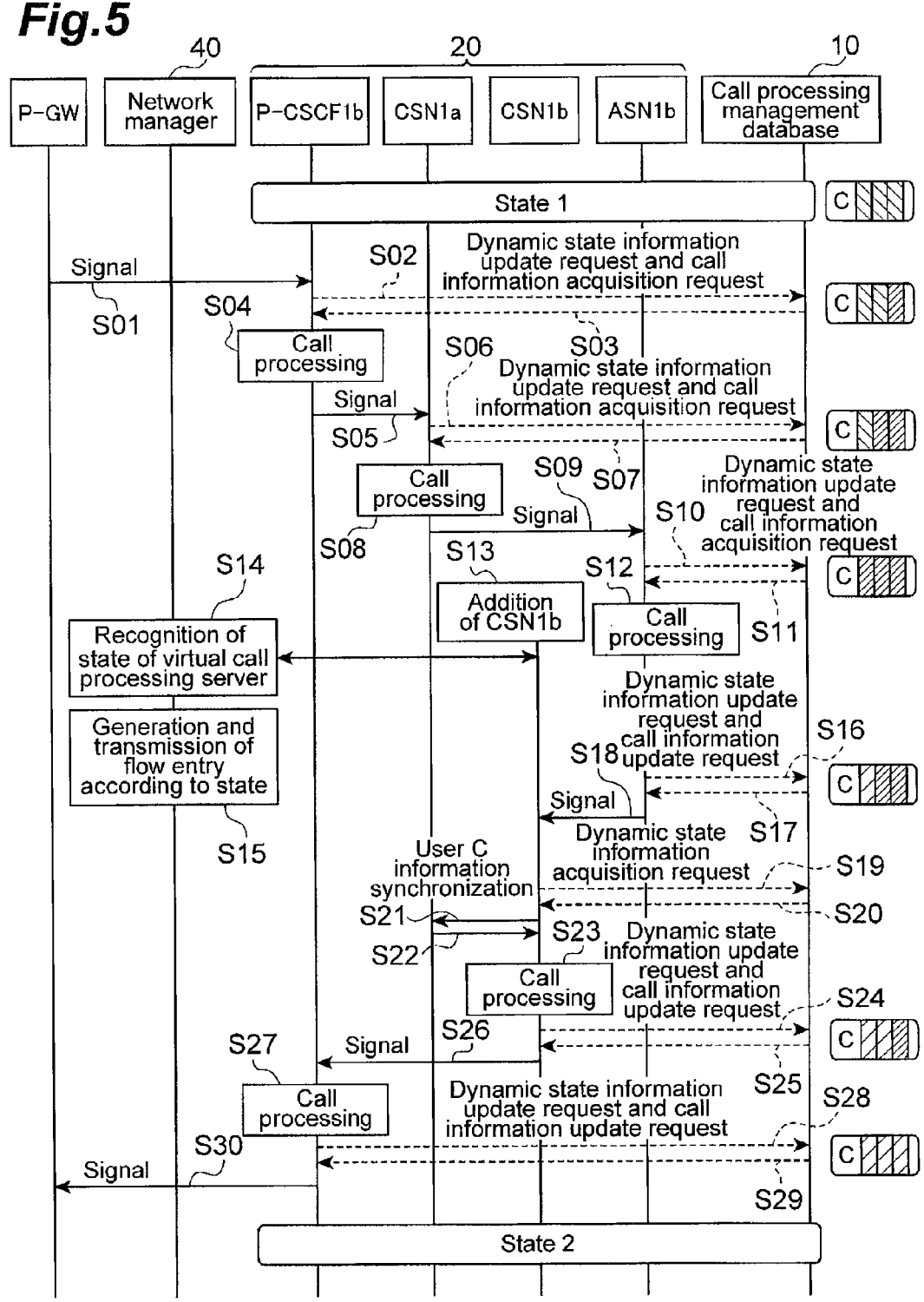
FIG. 5 is a sequence diagram illustrating a process (communication control method) that is executed when the call processing server is added in the mobile communication system according to an embodiment of the present invention.
Figure 6:
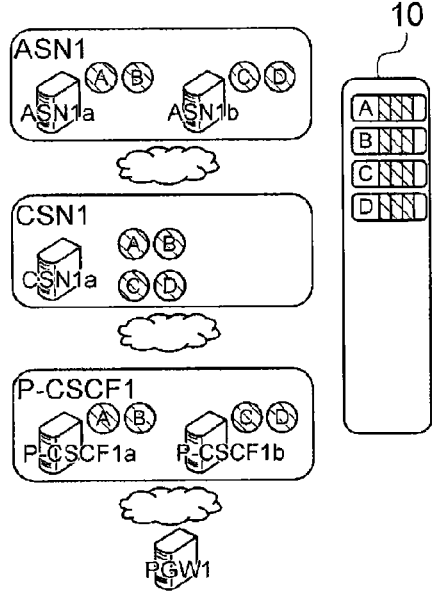
FIG. 6 is a diagram illustrating details of a part of information stored in the call processing server and the call processing management database in a process that is performed when the call processing server is added.
Figure 6:
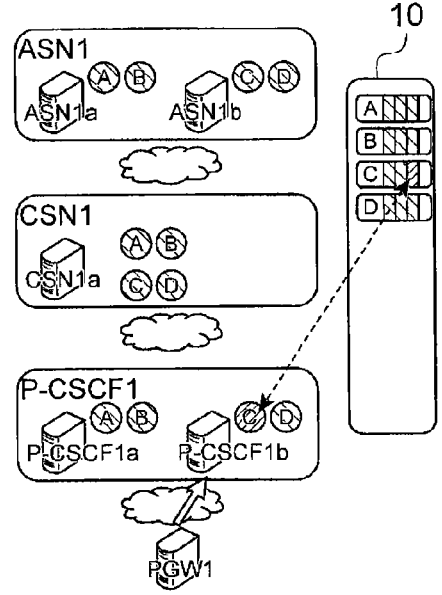
Figure 6:
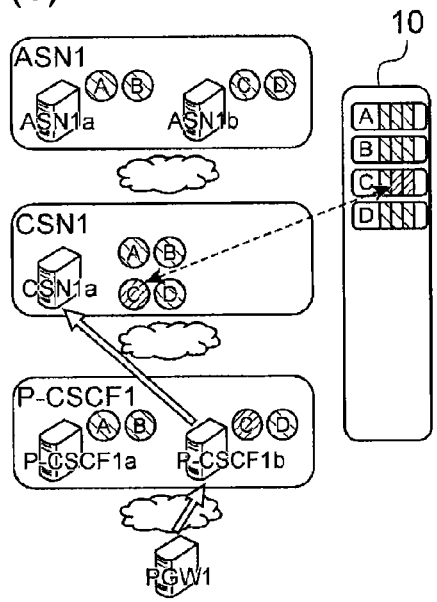
Figure 6:
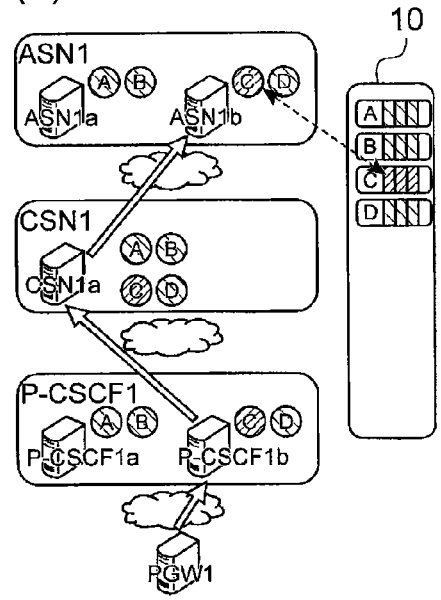
Figure 7:
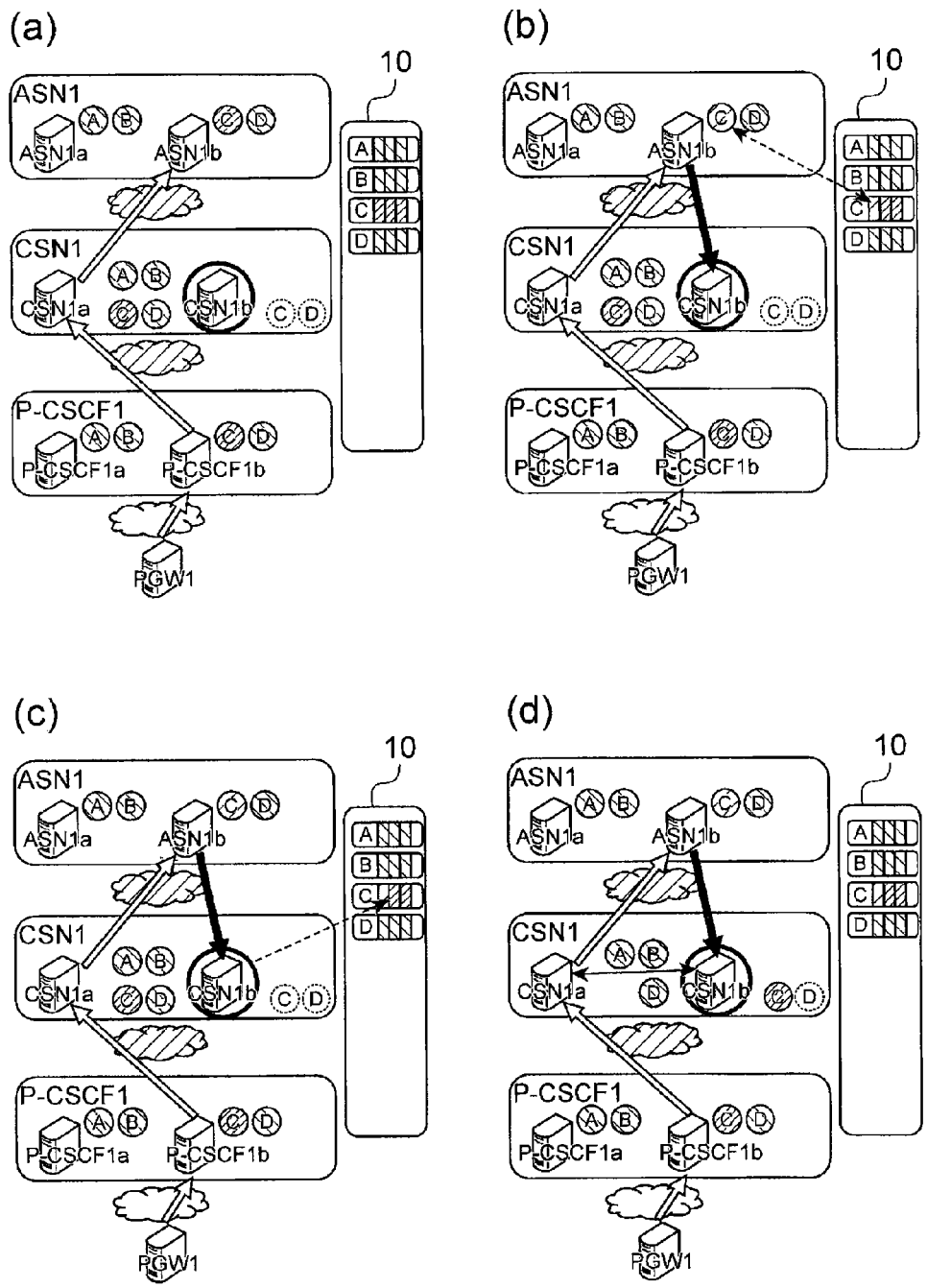
FIG. 7 is a diagram illustrating details of a part of information stored in the call processing server and the call processing management database in a process that is performed when the call processing server is added.
Figure 8:
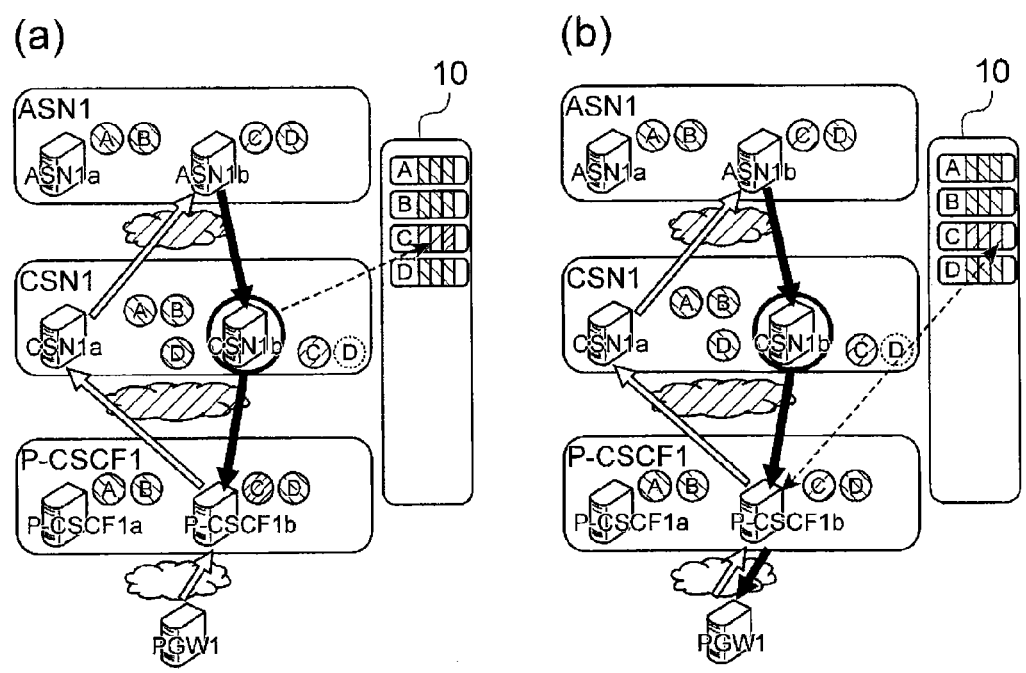
FIG. 8 is a diagram illustrating details of a part of information stored in the call processing server and the call processing management database in a process that is performed when the call processing server is added.
Figure 9:
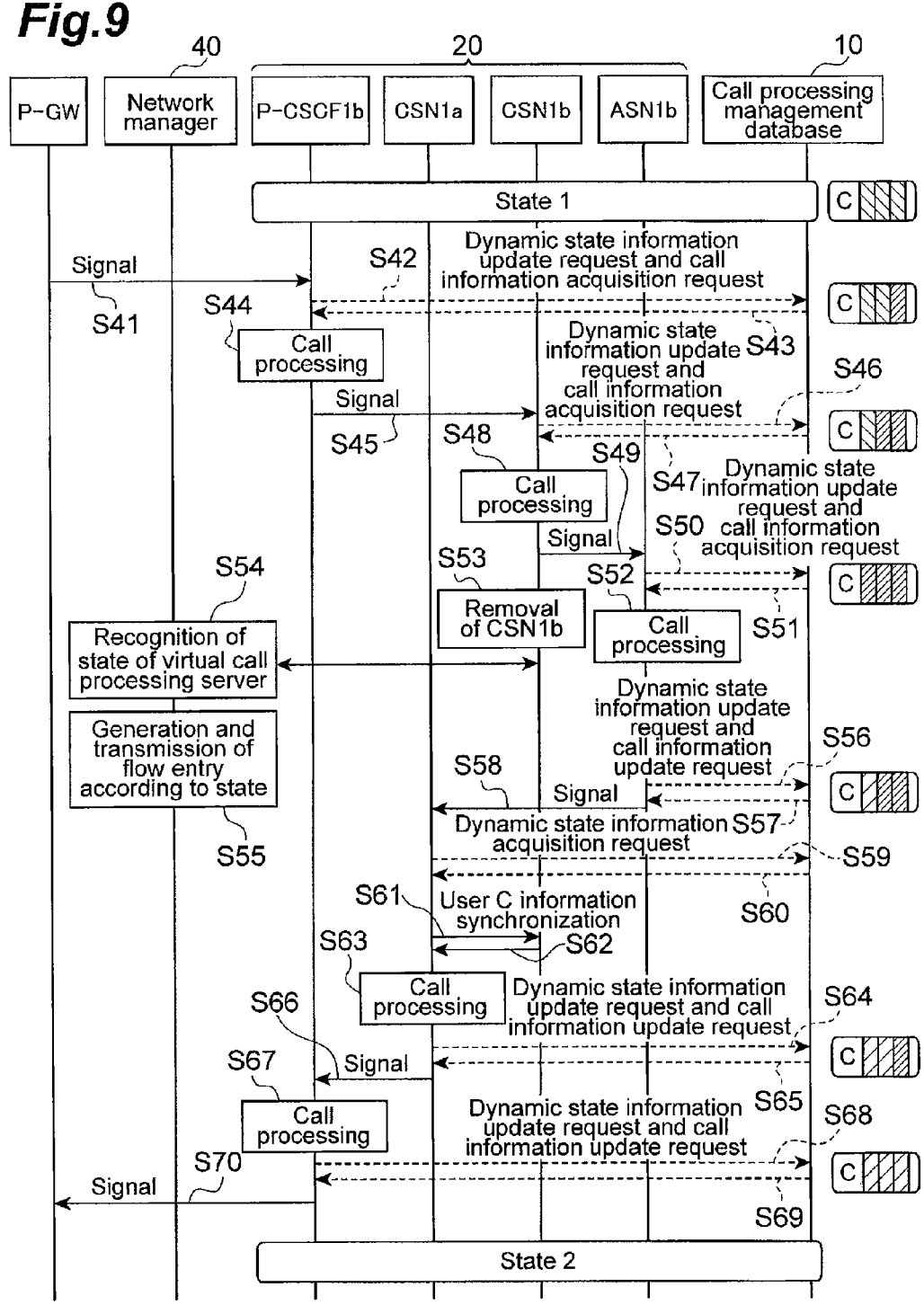
FIG. 9 is a sequence diagram illustrating a process (communication control method) that is executed when the call processing server is removed in the mobile communication system according to an embodiment of the present invention.

Next, a communication control method that is a process performed in the mobile communication system 1 according to the embodiment will be described using sequence diagrams of FIGS. 5 and 9 along with FIGS. 6 to 8 and FIGS. 10 to 12. First, a process when there is a request for call processing such as call origination from the mobile communication terminal 50 having the user identifier "C" to another terminal, and the call processing server 20 is added and scaled out during the call processing will be described using the sequence diagram of FIG. 5 along with FIGS. 6 to 8. In this process, an example in which the CSN is added will be described. In addition, an example in which a P-CSCF, a CSN and an ASN are provided as call processing servers as illustrated in FIG. 3 will be described.

The call processing servers (P-CSCF1, CSN1 and ASN1) 20 accommodate mobile communication terminals 50 (hereinafter referred to as users A, B, C and D) having user identifiers "A," "B," "C," and D," respectively. In the embodiment, the accommodation of the users refers to the fact that signals of the call processing related to the users are distributed to the respective call processing servers 20 by the OpenFlow network 30 and processed by the call processing servers 20. However, it is not necessary for the signal of the call processing to be distributed to a specific call processing server 20 according to the users, and a distribution destination may be determined by the OpenFlow network 30 based on the flow entry at the time of relaying of the signal.

P-CSCF1a accommodates users A and B, P-CSCF1b accommodates users C and D, CSN1a accommodates users A, B, C and D, ASN1a accommodates users A and B, and ASN1b accommodates users C and D, respectively. In an initial state of this process, a state of the call processing of any user is a state in which call processing is not being executed, for example, "state 1" that is a standby state, as illustrated in FIG. 6(a). As described above, attention is paid to user C in this process. Information (the same information as the information illustrated in FIG. 3) of user C held in the call processing management database 10 is illustrated in the sequence diagram of FIG. 5.

In the mobile communication system 1, the recognition of the state of each call processing server 20 is performed by the node state recognition unit 41 of the network manager 40. The information indicating the state of each call processing server 20 is output from the node state recognition unit 41 to the control unit 42. Then, the call processing server 20 to perform call processing is determined by the control unit 42 based on the information indicating the state of each call processing server 20, and a flow entry is generated so that the call processing request is transmitted to the determined call processing server 20. The generated flow entry is transmitted to each node 31 of the OpenFlow network 30. In each node 31 of the OpenFlow network 30, the flow entry is received, and transmission of a flow (a signal such as the call processing request) is performed based on the flow entry. In addition, the OpenFlow network 30 is not illustrated in FIG. 5.

In this process, a call origination request is first performed from user C to the mobile communication system 1 (mobile communication network). The call origination request is a request for call connection for performing communication with another terminal (for example, user X). A signal related to the call origination request (call origination signal) is received by P-GW.

The call origination signal is then transmitted from P-GW to P-CSCF1. The transmitted call origination signal is received by a predetermined node 31 (the node 31 connected with P-GW) of the OpenFlow network 30. P-CSCF1 (P-CSCF1b) of the request destination (transmission destination) is determined by the node 31 based on the flow entry. The call origination signal is then transmitted from the node 31 to P-CSCF1b (S01; control step).

In P-CSCF1b to which the call origination signal has been transmitted, the call origination signal is received by the call processing request accepting unit 21 (S01; call processing request accepting step). Information of the call origination request accepted by the call processing request accepting unit 21 is output to the registration unit 22, the acquisition unit 23 and the call processing unit 24. In P-CSCF1b, a dynamic state information update request is transmitted to the call processing management database 10 based on the call origination signal by the registration unit 22 (S02; registration step). The dynamic state information update request is a signal for registering the own node in the call processing management database 10 as P-CSCF that is executing the call processing for user C of a call processing request source related to the call origination signal. A user identifier of user C and a node ID of P-CSCF1 are contained in the dynamic state information update request. In addition, update or reference of the dynamic state information (update or reference of KVS) is performed even when there is a cache for the information of the mobile communication terminal 50 in the call processing server 20 (the same applies hereinafter).

In addition, data of user C necessary for call processing, that is, call information containing state information indicating the state of the call processing and the subscriber profile related to user C, is not held in P-CSCF1b.

Therefore, in P-CSCF1b, a call information acquisition request is performed from the acquisition unit 23 to the call processing management database 10 to request the call information related to user C who has performed the call origination request in conjunction with the transmission of the dynamic state information update request (S02; acquisition step). The dynamic state information update request and the call information acquisition request may be performed by the same signal or may be performed by separate signals.

In the call processing management database 10, the dynamic state information update request and the call information acquisition request are received. In the call processing management database 10, a call state of P-CSCF related to user C that is managed transitions from "state 1" to "state transitioning" based on the dynamic state information update request, as illustrated in FIG. 6(b). In addition, P-CSCF1b is registered as P-CSCF that is executing the call processing for user C. When the call state (state information) of user C is updated, an update completion notification is transmitted from the call processing management database 10 to P-CSCF1b (S03).

In addition, in the call processing management database 10, the call information related to user C is read based on the call information acquisition request and transmitted from the call processing management database 10 to P-CSCF1b as a call information acquisition response (S03). The update completion notification and the call information acquisition response may be performed by the same signal or may be performed by separate signals.

In P-CSCF1b, the call information is received by the acquisition unit 23 (S03; acquisition step). The call information acquired here is call information containing information indicating a standby status. Accordingly, P-CSCF1b holds the call information containing state information indicating the state of the call processing and the subscriber profile related to user C. The received call information is output from the acquisition unit 23 to the call processing unit 24.

The call processing according to the call origination request is then performed by the call processing unit 24 based on the call information acquired by the acquisition unit 23 (S04; call processing step). The call processing here is a call origination process of establishing call connection, and is performed according to a call origination sequence of establishing call connection with another server. Information during the call processing is held as the temporary information described above.

In one call processing, a call origination signal is then transmitted from the call processing unit 24 to CSN1. The transmitted call origination signal is received by a predetermined node 31 (the node 31 connected with P-CSCF1b) of the OpenFlow network 30. CSN1 (CSN1a) of a request destination (transmission destination) is determined by the node 31 based on the flow entry. The call origination signal is then transmitted from the node 31 to CSN1a (S05; control step).

In CSN1a to which the call origination signal has been transmitted, the call origination signal is received by the call processing request accepting unit 21 (S05; call processing request accepting step). Information of the call origination request accepted by the call processing request accepting unit 21 is output to the registration unit 22, the acquisition unit 23 and the call processing unit 24. In CSN1a, a dynamic state information update request is transmitted to the call processing management database 10 based on the call origination signal by the registration unit 22 (S06; registration step). The dynamic state information update request is a signal for registering the own node in the call processing management database 10 as a CSN that is executing the call processing for user C that is the call processing request source related to the call origination signal. The user identifier of the user C and the node ID of CSN1a are contained in the dynamic state information update request.

In addition, data of user C necessary for call processing, that is, call information containing state information indicating the state of the call processing and the subscriber profile related to user C, is not held in CSN1a.

Therefore, in CSN1a, a call information acquisition request is performed from the acquisition unit 23 to the call processing management database 10 to request the call information related to user C who has performed the call origination request in conjunction with the transmission of the dynamic state information update request (S06; acquisition step). The dynamic state information update request and the call information acquisition request may be performed by the same signal or may be performed by separate signals.

In the call processing management database 10, the dynamic state information update request and the call information acquisition request are received. In the call processing management database 10, a call state of the CSN related to the user C that is managed transitions from "state 1" to "state transitioning" based on the dynamic state information update request, as illustrated in FIG. 6(c). In addition, CSN1a is registered as a CSN that is executing the call processing for user C. When the call state (state information) of user C is updated, an update completion notification is transmitted from the call processing management database 10 to CSN1a (S07).

In addition, in the call processing management database 10, the call information related to user C is read based on the call information acquisition request and transmitted from the call processing management database 10 to CSN1a as a call information acquisition response (S07). The update completion notification and the call information acquisition response may be performed by the same signal or may be performed by separate signals.

In CSN1a, the call information is received by the acquisition unit 23 (S07; acquisition step). The call information acquired here is call information containing information indicating a standby status. Accordingly, CSN1a holds the call information containing state information indicating the state of the call processing and the subscriber profile related to user C. The received call information is output from the acquisition unit 23 to the call processing unit 24.

The call processing according to the call origination request is then performed by the call processing unit 24 based on the call information acquired by the acquisition unit 23 (S08; call processing step). The call processing here is a call origination process for establishing call connection, and is performed according to a call origination sequence of establishing call connection with another server. Information during the call processing is held as the temporary information described above.

In one call processing, the call origination signal is then transmitted from the call processing unit 24 to ASN1. The transmitted call origination signal is received by a predetermined node 31 (the node 31 connected with CSN1a) of the OpenFlow network 30. ASN1 (ASN1b) of a request destination (transmission destination) is determined by the node 31 based on the flow entry. The call origination signal is then transmitted from the node 31 to ASN1b (S09; control step).

In ASN1b to which the call origination signal has been transmitted, the call origination signal is received by the call processing request accepting unit 21 (S09; call processing request accepting step). Information of the call origination request accepted by the call processing request accepting unit 21 is output to the registration unit 22, the acquisition unit 23 and the call processing unit 24. In ASN1b, a dynamic state information update request is transmitted to the call processing management database 10 based on the call origination signal by the registration unit 22 (S10; registration step). The dynamic state information update request is a signal for registering the own node in the call processing management database 10 as an ASN that is executing the call processing for user C that is the call processing request source related to the call origination signal. A user identifier of user C and a node ID of ASN1b are contained in the dynamic state information update request.

In addition, data of user C necessary for call processing, that is, call information containing state information indicating the state of the call processing and the subscriber profile related to user C, is not held in ASN1b.

Therefore, in ASN1b, a call information acquisition request is performed from the acquisition unit 23 to the call processing management database 10 to request the call information related to user C who has performed the call origination request in conjunction with the transmission of the dynamic state information update request (S10; acquisition step). The dynamic state information update request and the call information acquisition request may be performed by the same signal or may be performed by separate signals.

In the call processing management database 10, the dynamic state information update request and the call information acquisition request are received. In the call processing management database 10, a call state of the ASN related to user C that is managed transitions from "state 1" to "state transitioning" based on the dynamic state information update request, as illustrated in FIG. 6(d). In addition, ASN1b is registered as an ASN that is executing the call processing for user C. When the call state (state information) of user C is updated, an update completion notification is transmitted from the call processing management database 10 to ASN1b (S11).

In addition, in the call processing management database 10, the call information related to user C is read based on the call information acquisition request and is transmitted from the call processing management database 10 to ASN1b as a call information acquisition response (S11). The update completion notification and the call information acquisition response may be performed by the same signal or may be performed by separate signals.

In ASN1b, the call information is received by the acquisition unit 23 (S11; acquisition step). The call information acquired here is call information containing information indicating a standby status. Accordingly, ASN1b holds the call information containing state information indicating the state of the call processing and the subscriber profile related to user C. The received call information is output from the acquisition unit 23 to the call processing unit 24.

The call processing according to the call origination request is then performed by the call processing unit 24 based on the call information acquired by the acquisition unit 23 (S12; call processing step). The call processing here is a call origination process of establishing call connection, and is performed according to a call origination sequence of establishing call connection with another server.

Here (at a timing after S09 and before S18), CSN1 is added to distribute a load of CSN1 (S13). This addition, for example, is performed by a communication carrier of the mobile communication system 1. In the mobile communication system 1, recognition of the state of each call processing server 20 is performed by the node state recognition unit 41 of the network manager 40 (S14; node state recognition step). At this time, the addition of CSN1b is also recognized by the node state recognition unit 41. Information indicating the state of each call processing server 20 is output from the node state recognition unit 41 to the control unit 42.

When the call processing server 20 is virtualized, S13 can be performed as the following process. In other words, for example, the node state recognition unit 41 recognizes insufficient processing capacity of the call processing server 20 caused by congestion or the like, and notifies the control unit 42 of the insufficient processing capacity. The control unit 42 instructs the virtual machine control unit to add the call processing server 20. The virtual machine control unit performs new provisioning of the call processing server 20.

The call processing server 20 to perform call processing is then determined by the control unit 42 based on the information indicating the state of each call processing server 20, and a flow entry is generated so that the call processing request is transmitted to the determined call processing server 20 (S15; control step). Here, since CSN1b is newly added, the flow entry generated here contains the newly added CSN1b as the call processing server 20 to perform call processing. For example, the flow entry is generated in which the call processing related to users C and D is executed by CSN1b (users C and D are accommodated in CSN1b), as illustrated in FIG. 7(a).

The generated flow entry is transmitted to each node 31 of the OpenFlow network 30 (S15; control step). In each node 31 of the OpenFlow network 30, the flow entry is received, and transmission of a flow (a signal such as the call processing request) is performed based on the flow entry.

In ASN1b, when call processing by the call processing unit 24 is completed, a communication state of the ASN related to user C transitions to, for example, "state 2" that is a call origination state. Information of a result of the call processing performed by the call processing unit 24 (call information that is made the state transition to "state 2") is output from the call processing unit 24 to the call processing result storage unit 25.

The dynamic state information update request is then transmitted to the call processing management database 10 by the call processing result storage unit 25 (S16; call processing result storage step). The dynamic state information update request transmitted here is a signal for notifying that the call processing in the own node ends, and the state of the call processing of user C transitions from state transitioning to a state in which the call processing is not being executed in any call processing server 20. The user identifier of user C and the node ID of ASN1b are contained in the dynamic state information update request.

In addition, the call information in which the result of the call processing has been reflected is transmitted from the call processing result storage unit 25 to the call processing management database 10 as a call information update request (S16; call processing result storage step). In addition, the call information update request and the dynamic state information update request may be performed by the same signal or may be performed by separate signals.

In the call processing management database 10, the dynamic state information update request and the call information update request are received. In the call processing management database 10, a call state of the ASN related to user C that is managed transitions from "state transitioning" to "state 2" based on the dynamic state information update request, as illustrated in FIG. 7(b). When the call state (state information) of user C is updated, an update completion notification is transmitted from the call processing management database 10 to ASN1b (S17).

In addition, in the call processing management database 10, the information related to user C is updated with the received information based on the call information update request. In other words, the call information after update contains the information indicating "state 2." When update is performed, a call information update response is transmitted from the call processing management database 10 to ASN1b (S17). In addition, the update completion notification and the call information update response may be performed by the same signal or may be performed by separate signals.

In ASN1b, when the call information update response is received, a signal according to the call origination response is transmitted to CSN1 (S18). The transmitted call origination response is received by a predetermined node 31 (the node 31 connected with ASN1b) of the OpenFlow network 30. CSN1 (CNS1b) of a request destination (transmission destination) is determined by the node 31 based on the flow entry. In the flow entry, a CSN performing call processing of user C is the added CSN1b, as described above. The call origination response is then transmitted from the node 31 to CSN1b (S18; control step).

In CSN1b to which the call origination response has been transmitted, the call origination response is received by the call processing request accepting unit 21 (S18; call processing request accepting step). Information of the call origination response accepted by the call processing request accepting unit 21 is output to the registration unit 22, the acquisition unit 23 and the call processing unit 24.

Since CSN1b is not the call processing server 20 that has been performing the call processing of user C until now, CSN1b does not hold the information related to user C. First, in CSN1b, a dynamic state information acquisition request is transmitted to the call processing management database 10 based on the call origination response by the registration unit 22 (S19; registration step). The dynamic state information acquisition request is a signal for requesting a node ID of the CSN registered as a CSN that is executing the call processing for user C that is the call processing request source related to the call origination response (a signal inquiring about a state of the CNS of user C). In addition, the dynamic state information acquisition request is also a signal for registering the own node in the call processing management database 10 as a CSN that is executing the call processing for user C that is the call processing request source related to the call origination response. The user identifier of the user C and the node ID of CSN1a are contained in the dynamic state information update request.

In the call processing management database 10, the dynamic state information acquisition request is received. In the call processing management database 10, a node ID of the CSN (node ID of CSN1a) (the information registered by CSN1a in S06) registered as a CSN that is executing the call processing for user C is transmitted to CSN1b as a response to the dynamic state information acquisition request (S20). In addition, in the call processing management database 10, CSN1b is registered as a CSN that is executing the call processing for user C based on the dynamic state information acquisition request, as illustrated in FIG. 7(*c*). In addition, the call state of the CSN related to user C remains "state transitioning." When the call state (state information) of user C is updated, an update completion notification is transmitted from the call processing management database 10 to CSN1b (S20). In addition, the response to the dynamic state information acquisition request and the update completion notification may be performed by the same signal or may be performed by separate signals.

In CSN1b, information for executing the call processing for user C is synchronized between CSN1b and CSN1a indicated by the node ID of the CSN registered as a CSN that is executing the call processing for user C, transmitted from the call processing management database 10, by the acquisition unit 23, as illustrated in FIG. 7(*d*). The synchronization of the information is performed through a request for synchronization from the acquisition unit 23 of CSN1b to CSN1a (S21) and reception of information transmitted from CSN1a according to the request (S22).

Here, temporary information used during call processing is contained in the information related to user C transmitted from CSN1a to CSN1b. In addition, the call information containing state information indicating the state of the call processing and the subscriber profile related to user C that CSN1a has acquired from the call processing management database 10 may be contained in the information. However, the information that can be acquired from the call processing management database 10 can be acquired from the call processing management database 10 instead of being acquired from CSN1a. The information for taking over the call processing related to user C acquired by the acquisition unit 23 in this way is output from the acquisition unit 23 to the call processing unit 24.

Call processing related to the call origination response (call origination request) is then executed by the call processing unit 24 based on the call information acquired by the acquisition unit 23 (S23; call processing step).

When call processing by the call processing unit 24 is completed, a communication state of the CSN related to user C transitions to "state 2." Information of a result of the call processing performed by the call processing unit 24 (call information that is made the state transition to "state 2") is output from the call processing unit 24 to the call processing result storage unit 25.

The dynamic state information update request is then transmitted to the call processing management database 10 by the call processing result storage unit 25 (S24; call processing result storage step). The dynamic state information update request transmitted here is a signal for notifying that the call processing in the own node ends and the state of the call processing of user C transitions from state transitioning to a state in which the call processing is not being executed in any call processing server 20. The user identifier of user C and the node ID of CSN1b are contained in the dynamic state information update request.

Further, the call information in which the result of the call processing has been reflected is transmitted from the call processing result storage unit 25 to the call processing management database 10 as a call information update request (S25; call processing result storage step). In addition, the call information update request and the dynamic state information update request may be performed by the same signal or may be performed by separate signals.

In the call processing management database 10, the dynamic state information update request and the call information update request are received. In the call processing management database 10, a call state of the CSN related to user C that is managed transitions from "state transitioning" to "state 2" based on the dynamic state information update request, as illustrated in FIG. 8(*a*). When the call state (state information) of user C is updated, an update completion notification is transmitted from the call processing management database 10 to CSN1b (S25).

In addition, in the call processing management database 10, the information related to user C is updated with the received information based on the call information update request. In other words, the call information after update contains the information indicating "state 2." When update is performed, a call information update response is transmitted from the call processing management database 10 to CSN1b (S25). In addition, the update completion notification and the call information update response may be performed by the same signal or may be performed by separate signals.

In CSN1b, when a call information update response is received, a signal according to the call origination response is transmitted to P-CSCF1 (S26). The transmitted call origination response is received by a predetermined node 31 (a node 31 connected with CSN1b) of the OpenFlow network 30. P-CSCF1 (P-CSCF1b) of a request destination (transmission destination) is determined based on the flow entry by the node 31. A call origination response is transmitted from the node 31 to P-CSCF1b (S26; control step).

In P-CSCF1b to which a call origination response has been transmitted, the call origination response is received by the call processing request accepting unit 21 (S26; call processing request accepting step). Information of the call origination response accepted by the call processing request accepting unit 21 is output to the call processing unit 24.

In P-CSCF1b, the call processing related to the call origination response (call origination request) is executed by the call processing unit 24 based on the input call origination response and the information used for the process in S04 (S27; call processing step).

When call processing by the call processing unit 24 is completed, a communication state of P-CSCF related to user C transitions to "state 2." Information (call information that is made the state transition to "state 2") of the result of the call processing performed by the call processing unit 24 is output from the call processing unit 24 to the call processing result storage unit 25.

A dynamic state information update request is then transmitted to the call processing management database 10 by the call processing result storage unit 25 (S28; call processing result storage step). The dynamic state information update request transmitted here is a signal for notifying that the call processing in the own node ends, and the state of the call processing of user C transitions from state transitioning to a state in which the call processing is not being executed in any call processing server 20. A user identifier of user C and a node ID of P-CSCF1b are contained in the dynamic state information update request.

In addition, the call information in which the result of the call processing has been reflected is transmitted as a call information update request from the call processing result storage unit 25 to the call processing management database 10 (S28; call processing result storage step). In addition, the call information update request and the dynamic state information update request may be performed by the same signal or may be performed by separate signals.

In the call processing management database 10, the dynamic state information update request and the call information update request are received. In the call processing management database 10, the call state of P-CSCF related to user C that is managed transitions from "state transitioning" to "state 2" based on the dynamic state information update request, as illustrated in FIG. 8(*b*). When the call state (state information) of user C is updated, an update completion notification is transmitted from the call processing management database 10 to P-CSCF1b (S29).

In addition, in the call processing management database 10, information related to user C is updated with the received information based on the call information update request. In other words, the call information after update includes information indicating "state 2." When the update is performed, the call information update response is transmitted from the call processing management database 10 to P-CSCF1b (S29). In addition, the update completion notification and the call information update response may be performed by the same signal or may be performed by separate signals.

In P-CSCF1b, when the call information update response is received, a signal according to the call origination response is transmitted to P-GW (S30). In addition, the signal according to the call origination response is transmitted from P-GW to user C. Through the above-described process, user C enters a call origination state ("state 2"), and the communication state of user C contained in the call information (a communication state of user C managed in the mobile communication network) also transitions to a call origination state ("state 2").

This is a process when there is a request for call processing such as call origination from the mobile communication terminal 50 having the user identifier "C" to another terminal, and the call processing server 20 is added and scaled out during the call processing. This process is a process at the time of call origination, but is similarly performed for other call processing. For example, when the mobile communication terminal 50 performs position registration, the call processing server 20 receiving a position registration request acquires call information indicating that the mobile communication terminal 50 is outside the area or is present in another position registration area through the process corresponding to S02, S03, S06, S07, S10, S11, S19, S20, S21, and S22 of FIG. 5. Also, the position registration process is performed through the process corresponding to S04, S08, S12, S23, and S27. Also, through the process corresponding to S16, S17, S24, S25, S28 and S29, call information after update related to the mobile communication terminal 50 containing the position registration area after position registration (or after update) and information during standby is stored in the call processing management database 10. In addition, the same process may be applied even when there is a request for call connection from a facing device.

Next, a process when there is a request for call processing such as call origination from user C to another terminal, and the call processing servers 20 are removed during this call processing will be described using a sequence diagram of FIG. 9, and FIGS. 10 to 12. In this process, an example in which the CSN is removed will be described. In addition, an example in which the P-CSCF, the CSN and the ASN are provided as call processing servers as illustrated in FIG. 3 will be described.

Figure 10:
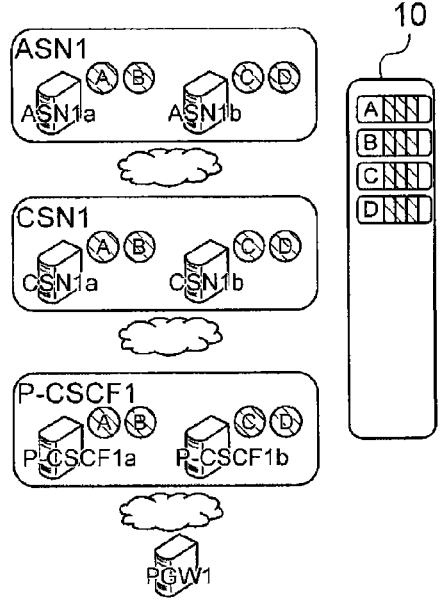
FIG. 10 is a diagram illustrating details of a part of information stored in the call processing server and the call processing management database in a process that is performed when the call processing server is removed.
Figure 10:
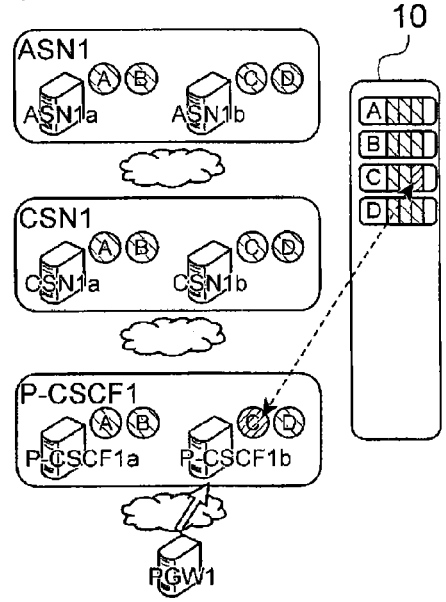
Figure 10:
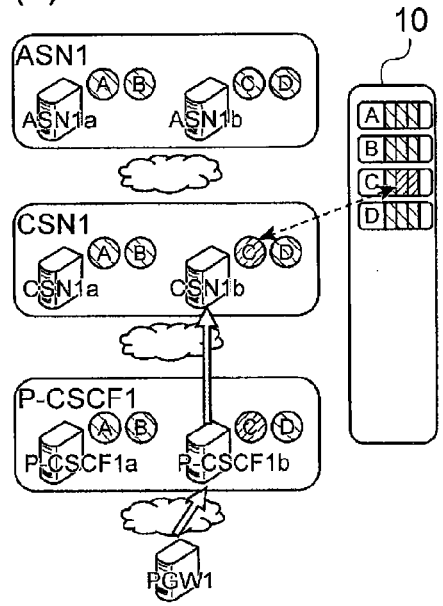
Figure 10:
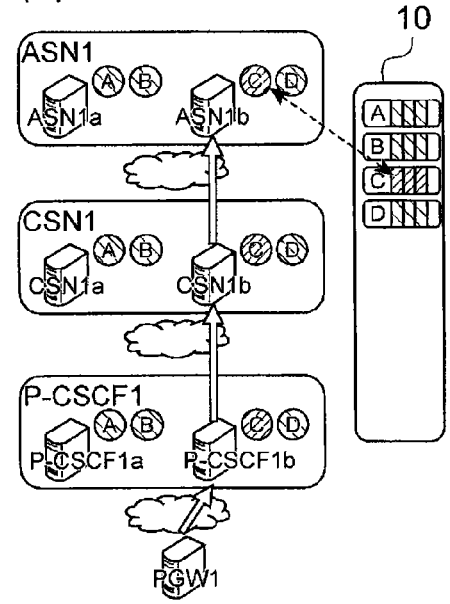

The call processing servers (P-CSCF1, CSN1 and ASN1) 20 accommodate users A, B, C and D, respectively. P-CSCF1a accommodates users A and B, P-CSCF1b accommodate users C and D, CSN1a accommodates users A and B, CSN1b accommodates users C and D, ASN1a accommodates users A and B, and ASN1b accommodates users C and D, respectively. In the initial state of this process, a state of call processing of any user is a state in which the call processing is not being executed, such as "state 1" that is a standby state, as illustrated in FIG. 10(*a*). As described above, attention is paid to user C in the process. Information (the same information as the information illustrated in FIG. 3) of user C held in the call processing management database 10 is shown in the sequence diagram of FIG. 9.

In the mobile communication system 1, recognition of the state of each call processing server 20 is performed by the node state recognition unit 41 of the network manager 40. Information indicating the state of each call processing server 20 is output from the node state recognition unit 41 to the control unit 42. The call processing server 20 to perform call processing is then determined by the control unit 42 based on the information indicating the state of each call processing server 20, and a flow entry is generated so that the call processing request is transmitted to the determined call processing server 20. The generated flow entry is transmitted to each node 31 of the OpenFlow network 30. In each node 31 of the OpenFlow network 30, the flow entry is received, and transmission of a flow (a signal such as the call processing request) is performed based on the flow entry. In addition, the OpenFlow network 30 is not illustrated in FIG. 9.

In this process, first, a call origination request is performed from user C to the mobile communication system (mobile communication network) 1. The call origination request is a request for call connection for performing communication with the other terminal (for example, user X). The signal related to the call origination request (call origination signal) is received by P-GW.

The call origination signal is then transmitted from P-GW to P-CSCF1. The transmitted call origination signal is received by a predetermined node 31 (the node 31 connected with P-GW) of the OpenFlow network 30. P-CSCF1 (P-CSCF1b) of a request destination (transmission destination) is determined by the node 31 based on the flow entry. The call origination signal is then transmitted from the node 31 to P-CSCF1b (S41; control step).

In P-CSCF1b to which the call origination signal has been transmitted, the call origination signal is received by the call processing request accepting unit 21 (S41; call processing request accepting step). Information of the call origination request accepted by the call processing request accepting unit 21 is output to the registration unit 22, the acquisition unit 23 and the call processing unit 24. In P-CSCF1b, a dynamic state information update request is transmitted to the call processing management database 10 based on the call origination signal by the registration unit 22 (S42; registration step). The dynamic state information update request is a signal for registering the own node in the call processing management database 10 as P-CSCF that is executing the call processing for user C that is the call processing request source related to the call origination signal. A user identifier of user C and a node ID of P-CSCF1b are contained in the dynamic state information update request.

In addition, data of user C necessary for call processing, that is, call information containing state information indicating the state of the call processing and the subscriber profile related to user C, is not held in P-CSCF1b.

Therefore, in P-CSCF1b, a call information acquisition request is performed from the acquisition unit 23 to the call processing management database 10 to request the call information related to user C who has performed the call origination request in conjunction with the transmission of the dynamic state information update request (S42; acquisition step). The dynamic state information update request and the call information acquisition request may be performed by the same signal or may be performed by separate signals.

In the call processing management database 10, the dynamic state information update request and the call information acquisition request are received. In the call processing management database 10, a call state of P-CSCF related to user C that is managed transitions from "state 1" to "state transitioning" based on the dynamic state information update request, as illustrated in FIG. 10(*b*). In addition, P-CSCF1b is registered as P-CSCF that is executing the call processing for user C. When the call state (state information) of user C is updated, an update completion notification is transmitted from the call processing management database 10 to P-CSCF1b (S43).

In addition, in the call processing management database 10, the call information related to user C is read based on the call information acquisition request and transmitted from the call processing management database 10 to P-CSCF1b as a call information acquisition response (S43). The update completion notification and the call information acquisition response may be performed by the same signal or may be performed by separate signals.

In P-CSCF1b, the call information is received by the acquisition unit 23 (S43; acquisition step). The call information acquired here is call information containing information indicating a standby status. Accordingly, P-CSCF1b holds the call information containing state information indicating the state of the call processing and the subscriber profile related to user C. The received call information is output from the acquisition unit 23 to the call processing unit 24.

The call processing according to the call origination request is then performed by the call processing unit 24 based on the call information acquired by the acquisition unit 23 (S44; call processing step). The call processing here is a call origination process of establishing call connection, and is performed according to a call origination sequence of establishing call connection with another server. Information during the call processing is held as the temporary information described above.

In one call processing, the call origination signal is then transmitted from the call processing unit 24 to CSN1. The transmitted call origination signal is received by a predetermined node 31 (the node 31 connected with P-CSCF1b) of the OpenFlow network 30. CSN1 (CSN1b) of a request destination (transmission destination) is determined by the node 31 based on the flow entry. The call origination signal is then transmitted from the node 31 to CSN1b (S45; control step).

In CSN1b to which the call origination signal has been transmitted, the call origination signal is received by the call processing request accepting unit 21 (S45; call processing request accepting step). Information of the call origination request accepted by the call processing request accepting unit 21 is output to the registration unit 22, the acquisition unit 23 and the call processing unit 24. In CSN1b, a dynamic state information update request is transmitted to the call processing management database 10 based on the call origination signal by the registration unit 22 (S46; registration step). The dynamic state information update request is a signal for registering the own node in the call processing management database 10 as a CSN that is executing the call processing for user C that is the call processing request source related to the call origination signal. The user identifier of user C and the node ID of CSN1b are contained in the dynamic state information update request.

In addition, data of user C necessary for call processing, that is, call information containing state information indicating the state of the call processing and the subscriber profile related to user C, is not held in CSN1b.

Therefore, in CSN1b, a call information acquisition request is performed from the acquisition unit 23 to the call processing management database 10 to request the call information related to user C who has performed the call origination request in conjunction with the transmission of the dynamic state information update request (S46; acquisition step). The dynamic state information update request and the call information acquisition request may be performed by the same signal or may be performed by separate signals.

In the call processing management database 10, the dynamic state information update request and the call information acquisition request are received. In the call processing management database 10, the call state of the CSN related to user C that is managed transitions from "state 1" to "state transitioning" based on the dynamic state information update request, as illustrated in FIG. 10(*c*). In addition, CSN1b is registered as a CSN that is executing the call processing for user C. When the call state (state information) of user C is updated, an update completion notification is transmitted from the call processing management database 10 to CSN1b (S47).

In addition, in the call processing management database 10, the call information related to user C is read based on the call information acquisition request and transmitted as a call information acquisition response from the call processing management database 10 to CSN1a (S47). The update completion notification and the call information acquisition response may be performed by the same signal or may be performed by separate signals.

In CSN1b, the call information is received by the acquisition unit 23 (S47; acquisition step). The call information acquired here is call information containing information indicating a standby status. Accordingly, CSN1b holds call information containing the state information indicating the state of the call processing and the subscriber profile related to user C. The received call information is output from the acquisition unit 23 to the call processing unit 24.

The call processing according to the call origination request is then executed by the call processing unit 24 based on the call information acquired by the acquisition unit 23 (S48; call processing step). Here, the call processing is a call origination process of establishing call connection, and is performed according to a call origination sequence of establishing call connection with another server. Information during the call processing is held as the temporary information described above.

In one call processing, the call origination signal is then transmitted from the call processing unit 24 to ASN1. The transmitted call origination signal is received by a predetermined node 31 (the node 31 connected with CSN1b) of the OpenFlow network 30. ASN1 (ASN1b) of the request destination (transmission destination) is determined based on the flow entry by the node 31. The call origination signal is then transmitted from the node 31 to ASN1b (S49; control step).

In ASN1b to which the call origination signal is transmitted, the call origination signal is received by the call processing request accepting unit 21 (S49; call processing request accepting step). The information of the call origination request accepted by the call processing request accepting unit 21 is output to the registration unit 22, the acquisition unit 23 and the call processing unit 24. In ASN1b, a dynamic state information update request is transmitted to the call processing management database 10 based on the call origination signal by the registration unit 22 (S51; registration step). The dynamic state information update request is a signal for registering the own node in the call processing management database 10 as an ASN that is executing the call processing for user C that is the call processing request source according to the call origination signal. The user identifier of user C and the node ID of ASN1b are contained in the dynamic state information update request.

In addition, data of user C necessary for call processing, that is, call information containing state information indicating the state of the call processing and the subscriber profile related to user C, is not held in ASN1b.

Therefore, in ASN1b, a call information acquisition request is performed from the acquisition unit 23 to the call processing management database 10 to request the call information related to user C who has performed the call origination request in conjunction with the transmission of the dynamic state information update request (S50; acquisition step). The dynamic state information update request and the call information acquisition request may be performed by the same signal or may be performed by separate signals.

In the call processing management database 10, the dynamic state information update request and the call information acquisition request are received. In the call processing management database 10, a call state of the ASN related to user C that is managed transitions from "state 1" to "state transitioning" based on the dynamic state information update request, as illustrated in FIG. 10(d). In addition, ASN1b is registered as an ASN that is executing the call processing for user C. When the call state (state information) of user C is updated, an update completion notification is transmitted from the call processing management database 10 to ASN1b (S51).

In addition, in the call processing management database 10, the call information related to user C is read based on the call information acquisition request and is transmitted from the call processing management database 10 to ASN1b as a call information acquisition response (S51). The update completion notification and the call information acquisition response may be performed by the same signal or may be performed by separate signals.

In ASN1b, the call information is received by the acquisition unit 23 (S51; acquisition step). The call information acquired here is call information containing information indicating a standby status. Accordingly, ASN1b holds the call information containing state information indicating the state of the call processing and the subscriber profile related to user C. The received call information is output from the acquisition unit 23 to the call processing unit 24.

The call processing according to the call origination request is then executed by the call processing unit 24 based on the call information acquired by the acquisition unit 23 (S52; call processing step). Here, the call processing is a call origination process for establishing call connection, and is performed according to a call origination sequence of establishing call connection with another server.

Here (a timing after S49 and before S58), since the load of CSN1 is aggregated, CSN1b is removed (S53). A user accommodated in CSN1b is moved to CSN1a due to removal of CSN1b. This removal is, for example, performed by the communication carrier of the mobile communication system 1. In the mobile communication system 1, the recognition of the state of each call processing server 20 is performed by the node state recognition unit 41 of the network manager 40 (S54; node state recognition step). At this time, removal of CSN1b is also recognized by the node state recognition unit 41. Information indicating the state of each call processing server 20 is output from the node state recognition unit 41 to the control unit 42.

When the call processing server 20 is virtualized, S53 can be performed as the following process. In other words, for example, the node state recognition unit 41 recognizes that a processing capacity of a plurality of call processing servers 20 of the same type is excessive and notifies the control unit 42 of that fact. The control unit 42 instructs the virtual machine control unit to remove the call processing servers 20. The virtual machine control unit removes the plurality of call processing servers 20.

The call processing server 20 to perform call processing is then determined by the control unit 42 based on the information indicating the state of each call processing server 20, and a flow entry is generated so that the call processing request is transmitted to the determined call processing server 20 (S55; control step). Here, since CSN1b is removed, the flow entry generated here is a flow entry in which CSN1b that has been removed is not included as the call processing server 20 to perform call processing. For example, the flow entry is generated in which the call processing related to users C and D is performed by CSN1a (users C and D are accommodated in CSN1a), as illustrated in FIG. 11(a).

The generated flow entry is transmitted to each node 31 of the OpenFlow network 30 (S55; control step). In each node 31 of the OpenFlow network 30, the flow entry is received, and transmission of a flow (a signal such as the call processing request) is performed based on the flow entry.

In ASN1b, when the call processing by the call processing unit 24 is completed, a communication state of the ASN related to user C transitions to, for example, "state 2" that is a call origination state. Information of a result of the call processing performed by the call processing unit 24 (call information that is made the state transition to "state 2") is output from the call processing unit 24 to the call processing result storage unit 25.

The dynamic state information update request is then transmitted to the call processing management database 10 by the call processing result storage unit 25 (S56; call processing result storage step). The dynamic state information update request transmitted here is a signal for notifying that the call processing in the own node ends and a state of the call processing of user C transitions from state transitioning to a state in which the call processing is not being executed in any call processing server 20. The user identifier of user C and the node ID of ASN1b are contained in the dynamic state information update request.

In addition, the call information in which the result of the call processing has been reflected is transmitted from the call processing result storage unit 25 to the call processing management database 10 as a call information update request (S56; call processing result storage step). In addition, the call information update request and the dynamic state information update request may be performed by the same signal or may be performed by separate signals.

Figure 11:
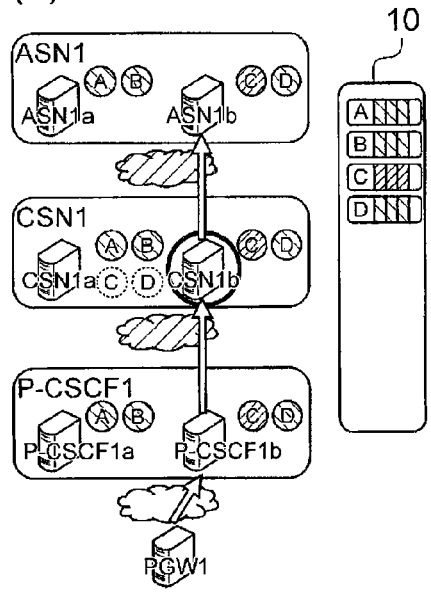
FIG. 11 is a diagram illustrating details of a part of information stored in the call processing server and the call processing management database in a process that is performed when the call processing server is removed.
Figure 11:
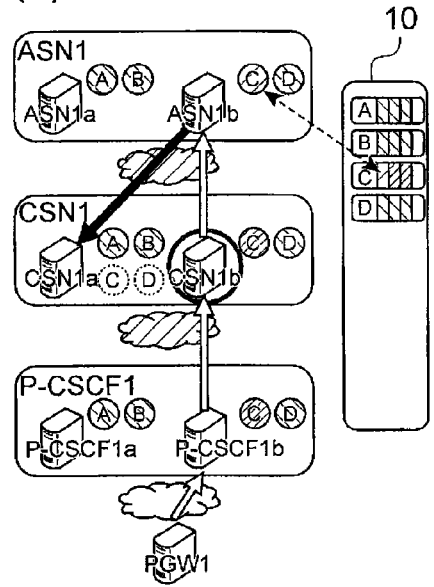
Figure 11:
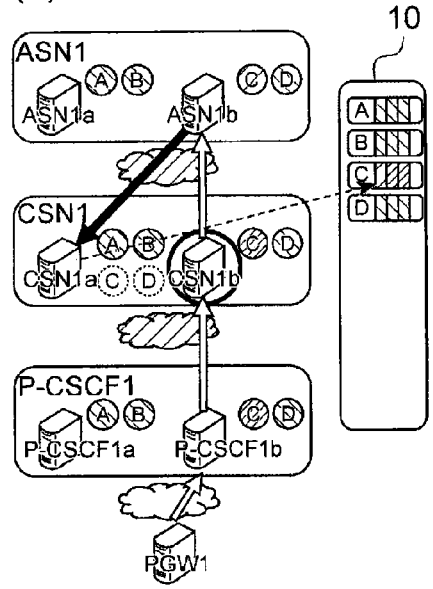
Figure 11:
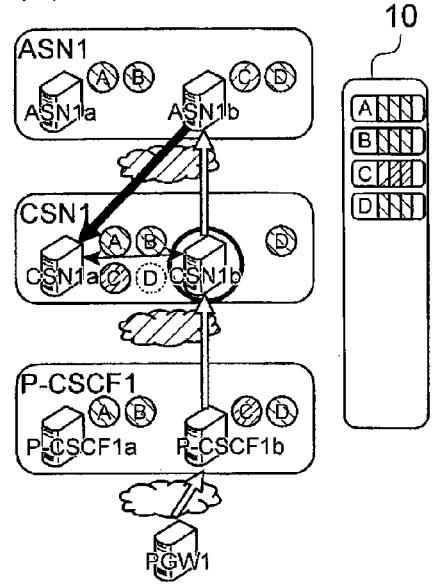

In the call processing management database 10, the dynamic state information update request and the call information update request are received. In the call processing management database 10, a call state of the ASN related to user C that is managed transitions from "state transitioning" to "state 2" based on the dynamic state information update request, as illustrated in FIG. 11(*b*). When the call state (state information) of user C is updated, an update completion notification is transmitted from the call processing management database 10 to ASN1b (S57).

In addition, in the call processing management database 10, the information related to user C is updated with the received information based on the call information update request. In other words, the call information after update contains the information indicating "state 2." When update is performed, a call information update response is transmitted from the call processing management database 10 to ASN1b (S57). In addition, the update completion notification and the call information update response may be performed by the same signal or may be performed by separate signals.

In ASN1b, when the call information update response is received, a signal according to the call origination response is transmitted to CSN1 (S58). The transmitted call origination response is received by a predetermined node 31 (the node 31 connected with ASN1b) of the OpenFlow network 30. CSN1 (CNS1a) of a request destination (transmission destination) is determined by the node 31 based on the flow entry. In the flow entry, the CSN to perform the call processing of user C is not CSN1b that has been removed, but CSN1a, as described above. A call origination response is then transmitted from the node 31 to CSN1a (S58; control step).

In CSN1a to which the call origination response has been transmitted, the call origination response is received by the call processing request accepting unit 21 (S58; call processing request accepting step). Information of the call origination response accepted by the call processing request accepting unit 21 is output to the registration unit 22, the acquisition unit 23 and the call processing unit 24.

Since CSN1a is not the call processing server 20 that has been performing the call processing of user C until now, CSN1a does not hold the information related to user C. First, in CSN1a, a dynamic state information acquisition request is transmitted to the call processing management database 10 based on the call origination response by the registration unit 22 (S59; registration step). The dynamic state information acquisition request is a signal for requesting a node ID of the CSN registered as a CSN that is executing the call processing for user C that is the call processing request source related to the call origination response (a signal inquiring about a state of the CNS of user C). In addition, the dynamic state information acquisition request is also a signal for registering the own node in the call processing management database 10 as a CSN that is executing the call processing for user C that is the call processing request source related to the call origination response. The user identifier of the user C and the node ID of CSN1a are contained in the dynamic state information update request.

In the call processing management database 10, the dynamic state information acquisition request is received. In the call processing management database 10, the node ID of the CSN (the node ID of CSN1b) (the information registered by CSN1b in S46) registered as a CSN that is executing the call processing for user C is transmitted to CSN1a as a response to the dynamic state information acquisition request (S60). In addition, in the call processing management database 10, CSN1a is registered as a CSN that is executing the call processing for user C based on the dynamic state information acquisition request, as illustrated in FIG. 11(*c*). In addition, the call state of the CSN related to user C remains as "state transitioning." When the call state (state information) of user C is updated, an update completion notification is transmitted from the call processing management database 10 to CSN1b (S60). In addition, the response to the dynamic state information acquisition request and the update completion notification may be performed by the same signal or may be performed by separate signals.

In CSN1a, information for executing the call processing for user C is synchronized between CSN1a and CSN1b indicated by the node ID of the CSN registered as a CSN that is executing the call processing for user C, which has been transmitted from the call processing management database 10, by the acquisition unit 23, as illustrated in FIG. 11(*d*). The synchronization of the information is performed through a request for synchronization from the acquisition unit 23 of CSN1a to CSN1b (S61) and reception of information transmitted from CSN1b in response to the request (S62).

Here, temporary information used during call processing is contained in the information related to user C transmitted from CSN1b to CSN1a. In addition, the call information containing state information indicating the state of the call processing and the subscriber profile related to user C acquired from the call processing management database 10 by CSN1b may be contained in the information. However, the information that can be acquired from the call processing management database 10 can be acquired from the call processing management database 10 instead of being acquired from CSN1b. The information for taking over the call processing related to user C acquired by the acquisition unit 23 in this way is output from the acquisition unit 23 to the call processing unit 24.

Call processing related to the call origination response (call origination request) is then executed by the call processing unit 24 based on the call information acquired by the acquisition unit 23 (S63; call processing step).

When call processing by the call processing unit 24 is completed, a communication state of the CSN related to user C transitions to "state 2." Information of a result of the call processing performed by the call processing unit 24 (call information that is made the state transition to "state 2") is output from the call processing unit 24 to the call processing result storage unit 25.

The dynamic state information update request is then transmitted to the call processing management database 10 by the call processing result storage unit 25 (S64; call processing result storage step). The dynamic state information update request transmitted here is a signal for notifying that the call processing in the own node ends, and the state of the call processing of user C transitions from state transitioning to a state in which the call processing is not being executed in any call processing server 20. The user identifier of the user C and the node ID of CSN1a are contained in the dynamic state information update request.

In addition, the call information in which the result of the call processing has been reflected is transmitted from the call processing result storage unit 25 to the call processing management database 10 as a call information update request (S65; call processing result storage step). In addition, the call information update request and the dynamic state information update request may be performed by the same signal or may be performed by separate signals.

Figure 12:
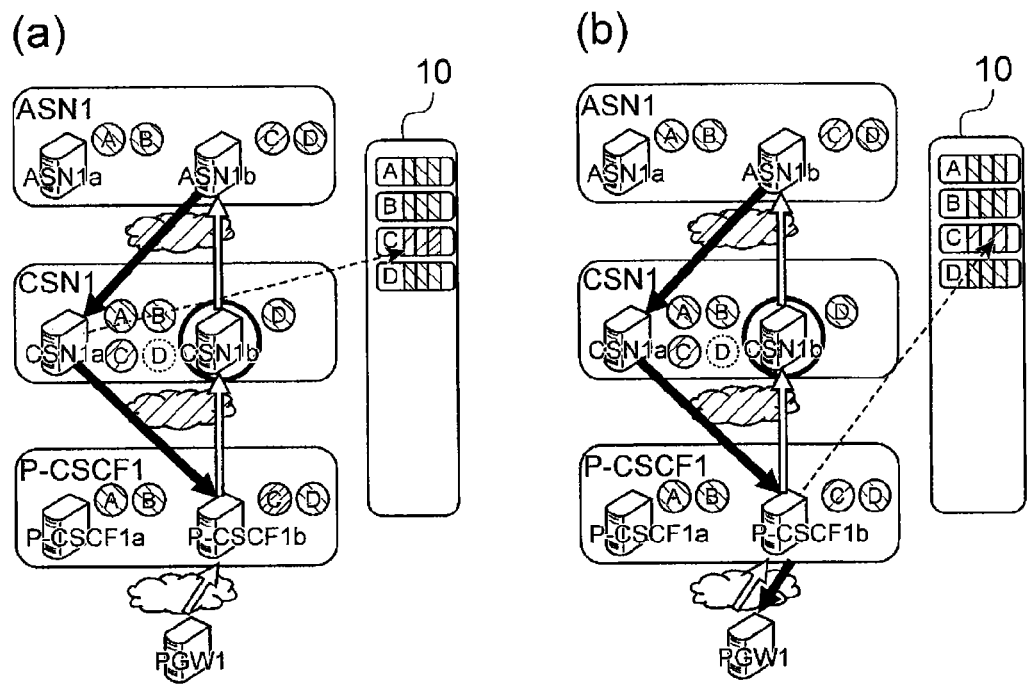
FIG. 12 is a diagram illustrating details of a part of information stored in the call processing server and the call processing management database in a process that is performed when the call processing server is removed.

In the call processing management database 10, the dynamic state information update request and the call information update request are received. In the call processing management database 10, a call state of the CSN related to user C that is managed transitions from "state transitioning" to "state 2" based on the dynamic state information update request, as illustrated in FIG. 12(*a*). When the call state (state information) of user C is updated, an update completion notification is transmitted from the call processing management database 10 to CSN1a (S65).

In addition, in the call processing management database 10, the information related to user C is updated with the received information based on the call information update request. In other words, the call information after update contains the information indicating "state 2." When update is performed, a call information update response is transmitted from the call processing management database 10 to CSN1a (S65). In addition, the update completion notification and the call information update response may be performed by the same signal or may be performed by separate signals.

In CSN1a, when a call information update response is received, a signal according to the call origination response is transmitted to P-CSCF1 (S66). The transmitted call origination response is received by a predetermined node 31 (the node 31 connected with CSN1a) of the OpenFlow network 30. P-CSCF1 (P-CSCF1b) of a request destination (transmission destination) is determined by the node 31 based on the flow entry. A call origination response is then transmitted from the node 31 to P-CSCF1b (S66; control step).

In P-CSCF1b to which the call origination response has been transmitted, the call origination response is received by the call processing request accepting unit 21 (S66; call processing request accepting step). Information of the call origination response accepted by the call processing request accepting unit 21 is output to the call processing unit 24.

In P-CSCF1b, the call processing related to the call origination response (call origination request) is executed by the call processing unit 24 based on the input call origination response and the information used for the process in S04 (S67; call processing step).

When the call processing by the call processing unit 24 is completed, a communication state of P-CSCF related to user C transitions to "state 2." Information of a result of the call processing performed by the call processing unit 24 (call information that is made the state transition to "state 2") is output from the call processing unit 24 to the call processing result storage unit 25.

The dynamic state information update request is then transmitted to the call processing management database 10 by the call processing result storage unit 25 (S68; call processing result storage step). The dynamic state information update request transmitted here is a signal for notifying that the call processing in the own node ends, and the state of the call processing of user C transitions from state transitioning to a state in which the call processing is not being executed in any call processing server 20. A user identifier of user C and a node ID of P-CSCF1b are contained in the dynamic state information update request.

In addition, the call information in which the result of the call processing has been reflected is transmitted from the call processing result storage unit 25 to the call processing management database 10 as a call information update request (S68; call processing result storage step). In addition, the call information update request and the dynamic state information update request may be performed by the same signal or may be performed by separate signals.

In the call processing management database 10, the dynamic state information update request and the call information update request are received. In the call processing management database 10, a call state of P-CSCF related to user C that is managed transitions from "state transitioning" to "state 2" based on the dynamic state information update request, as illustrated in FIG. 12(*b*). When the call state (state information) of user C is updated, an update completion notification is transmitted from the call processing management database 10 to P-CSCF1b (S69).

In addition, in the call processing management database 10, the information related to user C is updated with the received information based on the call information update request. In other words, the call information after update contains the information indicating "state 2." When update is performed, a call information update response is transmitted from the call processing management database 10 to P-CSCF1b (S69). In addition, the update completion notification and the call information update response may be performed by the same signal or may be performed by separate signals.

In P-CSCF1b, when the call information update response is received, a signal according to the call origination response is transmitted to P-GW (S70). In addition, the signal according to the call origination response is transmitted from P-GW to user C. Through the above-described process, user C enters a call origination state ("state 2"), and the communication state of user C contained in the call information (a communication state of user C managed in the mobile communication network) also transitions to the call origination state ("state 2").

This is a process when there is a request for call processing such as call origination from user C to the other terminal, and the call processing server 20 is removed during the call processing. This is a process at the time of the call origination, but the same is performed on other call processing as described above.

As described above, in the mobile communication system 1 according to the embodiment, in the call processing management database 10 having a different configuration from the call processing server 20 that is a call processing node, data of each mobile communication terminal 50 necessary for call processing is held, and the information is referred to and newly stored each time the call processing is performed. Therefore, in this mobile communication system 1, call processing related to any mobile communication terminal 50 can be executed by any call processing server 20. Also, in the mobile communication system 1, call processing can be performed by the call processing server 20 determined by the network manager 40 each time the call processing request is performed, instead of determining a call processing node performing the call processing for each mobile communication terminal 50.

In addition, in the conventional mobile communication system, once the call processing server performing call processing of the mobile communication terminal is determined through, for example, a process of causing the terminal to be present in the area, the state information that is the information necessary for call processing is held in the call processing server, and thus call processing cannot be performed by another call processing server instead. Therefore, in the conventional mobile communication system, the redundancy is achieved through an act/sby configuration of the call processing server, as described above.

As described above, in the present mobile communication system 1, the individual call processing servers 20 are not set to an sby system or an act system, and call processing can be executed by any call processing server 20, thus enabling more economical redundancy of the call processing nodes. In addition, call processing is possible if any call processing server 20 operates, thus enabling more reliable redundancy of the call processing servers 20. Further, since the individual call processing servers 20 do not hold data of each mobile communication terminal 50 necessary for call processing, the scale-out can be easily realized.

More specifically, the individual call processing servers 20 can be switched when the call processing servers 20 fail, as described above. In addition, the call processing servers 20 can be easily switched not only when the call processing servers 20 fail (suddenly stop), even when the call processing servers 20 stop according to a schedule. Further, when the call processing servers 20 are scaled out, a user can be easily moved to the added call processing server 20 without being triggered through a position registration process or the like. In the conventional mobile communication system, since it is difficult to move the mobile communication terminal that has already been present in the area to another call processing server as described above, users can be gradually moved even when the call processing server is added.

Further, in the mobile communication system 1 according to this embodiment, the call processing server 20 that is executing the call processing is registered in the call processing management database 10. When the call processing request is accepted by the call processing server 20 (CSN1b in the example of FIG. 5 or CSN1a in the example of FIG. 9) other than the call processing server 20 that is executing the call processing, information (information during call processing state transitioning) of the mobile communication terminal 50 related to the call processing request is acquired from the other call processing server 20 (CSN1a in the example of FIG. 5 or CSN1b in the example of FIG. 9) registered as the call processing server 20 that is executing the call processing.

Therefore, even when the call processing server 20 performing the call processing is changed during the call processing, since the information of the mobile communication terminal 50 related to the call processing request is taken over between the call processing servers 20, it is not necessary for the call processing server 20 after change to acquire the information acquired in the call processing server 20 before change again through, for example, processing relief based on retransmission control. Therefore, it becomes possible to perform an efficient process even when the call processing server 20 performing the call processing is changed during the call processing. More specifically, even when the call processing server 20 is added or removed using a virtualized server, a call is not disconnected during communication and the other call processing server 20 can take over processing, as described above. Thus, according to the present mobile communication system 1, the redundancy of the call processing node having excellent reliability, economical efficiency, and flexibility can be realized.

In addition, the OpenFlow network may be used, as in this embodiment. In accordance with this configuration, since the call processing server 20 is not associated with the position registration area, redundancy of the call processing servers 20 that does not depend on the position registration areas or the like can be realized, thus increasing the effects of the present invention described above. However, the present invention can be implemented in an aspect in which the call processing servers are associated with position registration areas. In this case, it is possible to realize the redundancy of the call processing servers having the excellent reliability, economical efficiency, and flexibility in the position registration areas.

REFERENCE SIGNS LIST

1 . . . mobile communication system, 2 . . . base, 10 . . . call processing management database, 20 . . . call processing server, 21 . . . call processing request accepting unit, 22 . . . registration unit, 23 . . . acquisition unit, 24 . . . call processing unit, 25 . . . call processing result storage unit, 30 . . . OpenFlow network, 31 . . . node, 40 . . . network manager, 41 . . . node state recognition unit, 42 . . . control unit, 50 . . . mobile communication terminal, 60 . . . facing node, 101 . . . CPU, 102 . . . RAM, 103 . . . ROM, 104 . . . communication module, 105 . . . auxiliary storage device.

The invention claimed is:

1. A mobile communication system that provides a mobile communication function to a mobile communication terminal and includes:
  a plurality of call processing nodes;
  a call processing management database that is connected to each of the plurality of call processing nodes and holds data of each mobile communication terminal necessary for call processing; and
  a control node,
  wherein
  the control node comprises circuitry configured to
    recognize states of the plurality of call processing nodes,
    determine a call processing node of the plurality of call processing nodes to process a call processing request from the mobile communication terminal for establishing a call connection based on the states of the plurality of call processing nodes, and
    perform control so that the call processing request is processed by the determined call processing node; and
  the determined call processing node comprises circuitry configured to
    receive the call processing request subjected to the control of the control node,
    register the determined call processing node in the call processing management database as a registered call processing node for executing a call processing for establishing the call connection in response to the call processing request when the call processing request is received by the determined call processing node,
    acquire information of the mobile communication terminal related to the call processing request from the call processing management database, the acquired information including a recorded state of the call processing, when there is another call processing node previously registered in the call processing management database as the registered call processing node for executing the call processing, send a synchronization request for temporary information corresponding to executing the call processing to, and receive the temporary information corresponding to executing the call processing that is provided in response to the synchronization request by, the another call processing node of the plurality of call processing nodes, execute the call processing for establishing the call connection using the information of the mobile communication terminal related to the call processing request when there is no call processing node previously registered in the call processing management database, and using the information of the mobile communication terminal related to the call processing request and the received temporary information corresponding to executing the call processing when there is the another call processing node previously registered in the call processing management database, store information of a result of the call processing executed by the determined call processing node in the call processing management database, the information of the result of the call processing including an updated state of the call processing, and end registration, in the call processing management database, of the determined call processing node as the registered call processing node for executing the call processing for the mobile communication terminal related to the call processing request when the call processing ends.

2. The mobile communication system according to claim 1, further comprising a flow control network,
wherein the control node configures the flow control network so that the call processing request is processed by the determined call processing node.

3. The mobile communication system according to claim 1, wherein
at least one call processing node of the plurality of call processing nodes is a virtualized virtual machine in a server device, and
the control node further controls virtualization performed by the server device based on the states of the plurality of call processing nodes.

4. A first call processing node in a mobile communication system that provides a mobile communication function to a mobile communication terminal and includes a plurality of call processing nodes, a call processing management database that is connected to each of the plurality of call processing nodes and holds data of each mobile communication terminal necessary for call processing, and a control node, the plurality of call processing nodes including the first call processing node, and the first call processing node comprising:
circuitry configured to
receive a call processing request for establishing a call connection subjected to control of the control node;
register the first call processing node in the call processing management database as a registered call processing node for executing a call processing for establishing the call connection in response to the call processing request when the call processing request is received by the first call processing node,
acquire information of the mobile communication terminal related to the call processing request from the call processing management database, the acquired information including a recorded state of the call processing, when there is a second call processing node previously registered in the call processing management database as the registered call processing node for executing the call processing, send a synchronization request for temporary information corresponding to executing the call processing to, and receive the temporary information corresponding to executing the call processing that is provided in response to the synchronization request by, the second call processing node of the plurality of call processing nodes, execute the call processing for establishing the call connection using the information of the mobile communication terminal related to the call processing request when there is no call processing node previously registered in the call processing management database, and using the information of the mobile communication terminal related to the call processing request and the received temporary information corresponding to executing the call processing when there is the second call processing node previously registered in the call processing management database, store information of a result of the call processing executed by the first call processing node in the call processing management database, the information of the result of the call processing including an updated state of the call processing, and end registration, in the call processing management database, of the first call processing node as the registered call processing node for executing the call processing for the mobile communication terminal related to the call processing request when the call processing ends.

5. A communication control method in a mobile communication system that provides a mobile communication function to a mobile communication terminal and includes a plurality of call processing nodes, a call processing management database that is connected to each of the plurality of call processing nodes and holds data of each mobile communication terminal necessary for call processing, and a control node, the method comprising:
recognizing, by the control node, states of the plurality of call processing nodes;
determining, by the control node, a call processing node of the plurality of call processing nodes to process a call processing request from the mobile communication terminal for establishing a call connection based on the states of the plurality of call processing nodes;
performing control, by the control node, so that the call processing request is processed by the determined call processing node;
receiving, by the determined call processing node, the call processing request subjected to the control of the control node;
registering, by the determined call processing node, the determined call processing node in the call processing management database as a registered call processing node for executing a call processing for establishing the call connection in response to the call processing request when the call processing request is received by the determined call processing node;
acquiring, by the determined call processing node, information of the mobile communication terminal related to the call processing request from the call processing management database, the acquired information including a recorded state of the call processing;

when there is another call processing node previously registered in the call processing management database as the registered call processing node for executing the call processing, sending a synchronization request for temporary information corresponding to executing the call processing to, and receiving the temporary information corresponding to executing the call processing that is provided in response to the synchronization request by, the another call processing node of the plurality of call processing nodes by the determined call processing node;

executing, by the determined call processing node, the call processing for establishing the call connection using the information of the mobile communication terminal related to the call processing request when there is no call processing node previously registered in the call processing management database, and using the information of the mobile communication terminal related to the call processing request and the received temporary information corresponding to executing the call processing when there is the another call processing node previously registered in the call processing management database;

storing, by the determined call processing node, information of a result of the call processing executed by the determined call processing node in the call processing management database, the information of the result of the call processing including an updated state of the call processing; and ending registration, in the call processing management database, of the determined call processing node as the registered call processing node for executing the call processing for the mobile communication terminal related to the call processing request when the call processing ends.

6. A communication control method for a first call processing node in a mobile communication system that provides a mobile communication function to a mobile communication terminal and includes a plurality of call processing nodes, a call processing management database that is connected to each of the plurality of call processing nodes and holds data of each mobile communication terminal necessary for call processing, and a control node, the communication control method comprising:

receiving a request of call processing for establishing a call connection subjected to control of the control node;

registering the first call processing node of the plurality of call processing nodes in the call processing management database as a registered call processing node for executing a call processing for establishing the call connection in response to the call processing request when the call processing request is received by the first call processing node;

acquiring, by the first call processing node, information of the mobile communication terminal related to the call processing request from the call processing management database, the acquired information including a recorded state of the call processing;

when there is a second call processing node previously registered in the call processing management database as the registered call processing node for executing the call processing, sending a synchronization request for temporary information corresponding to executing the call processing to, and receiving the temporary information corresponding to executing the call processing that is provided in response to the synchronization request by, the second call processing node of the plurality of call processing nodes by the first call processing node;

executing, by the first call processing node, the call processing for establishing the call connection using the information of the mobile communication terminal related to the call processing request when there is no call processing node previously registered in the call processing management database, and using the information of the mobile communication terminal related to the call processing request and the received temporary information corresponding to executing the call processing when there is the second call processing node previously registered in the call processing management database;

storing information of a result of the call processing executed by the first call processing node in the call processing management database, the information of the result of the call processing including an updated state of the call processing; and ending registration, in the call processing management database, of the first call processing node as the registered call processing node for executing the call processing for the mobile communication terminal related to the call processing request when the call processing ends.

* * * * *